(12) United States Patent
De Vrij

(10) Patent No.: US 12,435,110 B2
(45) Date of Patent: Oct. 7, 2025

(54) ADENOSOMES

(71) Applicant: Erasmus University Medical Center Rotterdam, Rotterdam (NL)

(72) Inventor: Jeroen De Vrij, Leidschendam (NL)

(73) Assignee: Erasmus University Medical Center Rotterdam, Rotterdam (NL)

( * ) Notice: Subject to any disclaimer, the term of this patent is extended or adjusted under 35 U.S.C. 154(b) by 1190 days.

(21) Appl. No.: 17/274,891

(22) PCT Filed: Sep. 17, 2019

(86) PCT No.: PCT/NL2019/050611
§ 371 (c)(1),
(2) Date: Mar. 10, 2021

(87) PCT Pub. No.: WO2020/060400
PCT Pub. Date: Mar. 26, 2020

(65) Prior Publication Data
US 2022/0056081 A1 Feb. 24, 2022

(30) Foreign Application Priority Data
Sep. 17, 2018 (NL) .................................. 2021648

(51) Int. Cl.
| A61K 35/761 | (2015.01) |
| C07K 14/005 | (2006.01) |
| C12N 15/86 | (2006.01) |
| C12N 15/88 | (2006.01) |

(52) U.S. Cl.
CPC .......... *C07K 14/005* (2013.01); *A61K 35/761* (2013.01); *C12N 15/86* (2013.01); *C12N 15/88* (2013.01); *C07K 2319/60* (2013.01); *C12N 2710/10322* (2013.01); *C12N 2710/10332* (2013.01); *C12N 2710/10343* (2013.01); *C12N 2710/10345* (2013.01); *C12N 2710/10362* (2013.01); *C12N 2810/405* (2013.01)

(58) Field of Classification Search
None
See application file for complete search history.

(56) References Cited

U.S. PATENT DOCUMENTS 7,244,617 B2 * 7/2007 Fang ...................... C12N 15/86 435/456
2005/0026139 A1 2/2005 Fang et al.

FOREIGN PATENT DOCUMENTS

WO 2006007529 A2 1/2006
WO 2018118967 A1 6/2018

OTHER PUBLICATIONS

De Vrij (Thesis Universiteit Leiden, 2012, p. 1-165).*
Garofalo et al. (Jun. 1, 2018. Journal of Controlled Release, p. 223-234).*
Parks, Robin J., et al., "A Helper-Dependent Adenovirus Vector System: Removal of Helper Virus by Cre-Mediated Excision of the Viral Packaging Signal," Proceedings of the National Academy of Sciences, vol. 93, No. 24, pp. 13565-13570 1996).
De Vrij, Jeroen, et al., "Enhanced Transduction of CAR-Negative Cells by Protein IX-gene Deleted Adenovirus 5 Vectors," Virology, vol. 410, No. 1, pp. 192-200 (2011).
Ran, Li, et al., "Delivery of Oncolytic Adenovirus Into the Nucleus of Tumorigenic Cells by Tumor Microparticles for Virotherapy," Biomaterials, vol. 89, pp. 56-66 (2016).
Wodrich, Harald, et al., "Adenovirus Core Protein pVII is Translocated Into the Nucleus by Multiple Import Receptor Pathways," Journal of Virology, vol. 80, No. 19, pp. 9608-9618 (2006).
Garofalo, M., et al., "Antitumor Effect of Oncolytic Virus and Paclitaxel Encapsulated in Extracellular Vesicles for Lung Cancer Treatment," Journal of Controlled Release, vol. 283, pp. 223-234 (2018).
Takahashi, Akiko, et al, "Exosomes Maintain Cellular Homeostasis by Excreting Harmful DNA From cells," Nature Communications, vol. 8, No. 1, pp. 1-16 (2017).
Balvers, Rutger K., et al., "Locally-Delivered T-Cell-Derived Cellular Vehicles Efficiently Track and Deliver Adenovirus delta24-RGD to Infiltrating Glioma," Viruses, vol. 6, No. 8, pp. 3080-3096 (2014).
Matthews, David A. "Adenovirus Protein V Induces Redistribution of Nucleolin and B23 from Nucleolus to Cytoplasm," Journal of Virology, vol. 75, No. 2, pp. 1031-1038 (2001).
Puntel, Mariana, et al., "A Novel Bicistronic High-Capacity Gutless Adenovirus Vector that Drives Constitutive Expression of Herpes Simplex Virus Type 1 Thymidine Kinase and Tet-Inducible Expression of Flt3L for Glioma Therapeutics," Journal of Virology, vol. 84, No. 12, pp. 6007-6017 (2010).
Le, Long P. et al., "Core Labeling of Adenovirus with EGFP", Virology, vol. 351, No. 2 (Aug. 2006), pp. 291-302 DOI: 10,1016/j.virol.2006.03.042.
Fu, Yuchang et al., "Expression of Circular Plasmids Which Contain Bacterial Chloramphenicol Acetyltransferase Gene Connected to the Promoter of Polypeptide IX Gene of Human Adenovirus Type 12 in Oocytes, Eggs and Embryos of Xenopus Laevis", Zoological Science, vol. 7, No. 2 (Apr. 1990), pp. 195-200.
Fu, Y. et al., "Expression of circular and linearized bacterial chloramphenicol acetyltransferase genes with or without viral promoters after injection into fertilized eggs, unfertilized eggs and oocytes of Xenopus laevis." Roux's Archives of Developmental Biology, 1989, pp. 148-156, vol. 198.

* cited by examiner

Primary Examiner — Agnieszka Boesen
(74) Attorney, Agent, or Firm — Hoffmann & Baron, LLP

(57) ABSTRACT

The invention relates to a recombinant adenovirus nucleic acid wherein the gene encoding protein V and/or the gene encoding protein VII is placed under control of a heterologous promoter, to a recombinant adenovirus nucleic acid wherein the adenoviral nucleotide sequence is mutated in such a way that it is no longer capable of producing one or more of the coat proteins, to cellular vesicles filled with such adenoviral material, cells provided with such adenoviral material and to methods and use thereof.

14 Claims, 8 Drawing Sheets

Figure 1:
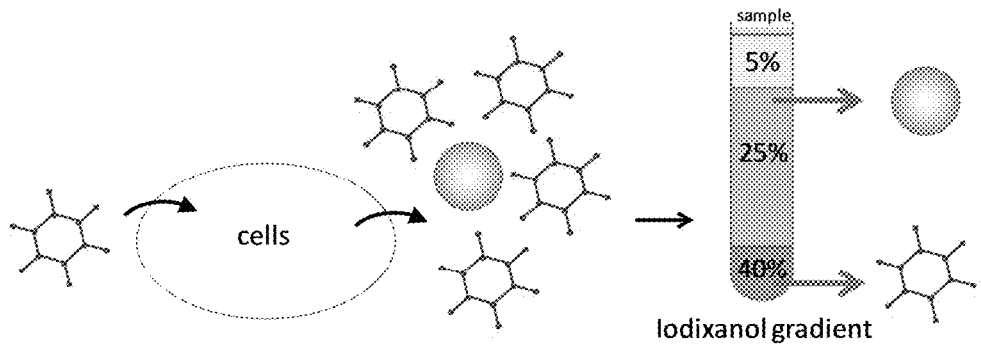
Figure 1:
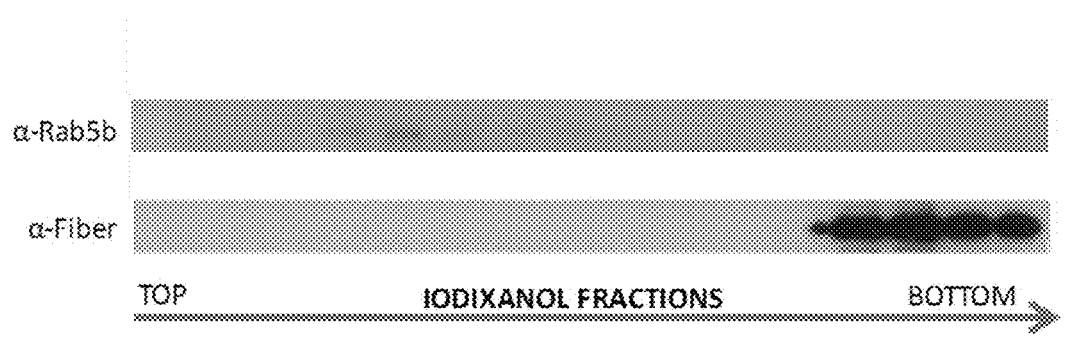

A.

B.

C.

| | | cells | virus | EVs |
|---|---|---|---|---|
| capsid | Hexon | ++ | ++ | - |
| | Penton base | ++ | ++ | - |
| | Fiber | ++ | ++ | - |
| core | V | + | + | ++ |
| | VII | + | + | ++ |

C.

A.

B.

C.

D.

A.

B.

A.

B.

qPCR on iodixanol fractions (Adenovirus DNA)

qPCR on iodixanol fractions (pUC57 plasmid DNA)

ADENOSOMES

This application is a U.S. National Phase of, and Applicant claims priority from, International Patent Application No. PCT/NL2019/050611, filed Sep. 17, 2019, which claims priority from NL 2021648, filed Sep. 17, 2018, each of which is incorporated herein by reference in its entirety.

FIELD OF THE INVENTION

The invention relates to a recombinant adenovirus nucleic acid wherein the gene encoding protein V and/or the gene encoding protein VII is placed under control of a heterologous promoter, to a recombinant adenovirus nucleic acid wherein the adenoviral nucleotide sequence is mutated in such a way that it is no longer capable of producing one or more of the coat proteins, to cellular vesicles filled with such adenoviral material, cells provided with such adenoviral material and to methods and uses thereof.

BACKGROUND OF THE INVENTION

Gene therapy is a therapeutic method wherein genetic material is introduced into a cell where it can replace a defective gene or where it codes for the expression of therapeutic molecules, such as cytokines or therapeutic antibodies.

These genes are delivered into the cell using a suitable vehicle, such as a virus vector. Virus vectors have the natural ability to infect a cell by inserting and replicating their DNA into a cell.

Adenoviruses are often used as a virus vector. The adenovirus is a well-characterized non-enveloped virus that is associated with infection of the respiratory tract and conjunctivitis. (Chu, R. L., Clinical Cancer Research, 2004, 10, 5299-5312).

Adenoviruses are particularly suitable virus vectors, because they are able to infect both replicating as well as quiescent cells, are able to host large pieces of DNA (up to 30 kbp) and do not integrate into the genome of the host cell. Furthermore, extensive molecular biological knowledge is available and the virus can be efficiently purified to high titers.

Different subtypes of adenoviruses exist, of which type 2 and 5 are most commonly used for delivery vehicle purposes.

A fully matured human adenovirus type 5 virus particle is approximately 110 nanometer, shaped as an icosahedron and contains a core including double stranded DNA surrounded by a capsid.

The major proteins forming the capsid are hexon, penton and fiber proteins, but the capsid additionally includes proteins IIIa, VI, VIII and IX. Herein, the fiber protein facilitates binding to host cell receptors such as the coxsackie-Ad receptor (CAR). Furthermore, protein IX was found to play a role in the stability of the virus particles. (Lee, C. S., et al. Genes & Diseases, 2017, 4, 43-63).

The core of the virus is constituted by a double-stranded linear DNA genome of 36 kb in size and the proteins IVa2, V, VII, terminal protein, mu and adenovirus protease.

The genome consists of the early genes E1A, E1B, E2, E3 and E4, which are involved in the replication of the viral DNA, the intermediate genes pIX and IVa2 and the late genes L1 to L5, encoding the capsid proteins, as well as core proteins V and VII.

To improve safety of the virus vectors different generations have been developed each containing specific modifications or deletions to the genome, altering the ability of the virus to replicate itself or to induce an immune response.

The first generation of adenoviruses contains a deletion of the E1 region to render the virus replication deficient. However, the use of such adenovirus vectors still leads to a strong immune response, which is associated with high cytotoxicity.

Hence, a second generation of virus vectors was developed wherein apart from the E1 region, specific mutations or deletions were made in the E2 and/or E4 gene. Although the immune response was significantly reduced, cytotoxic side-effects were still observed.

Thus, a third-generation or gutless adenovirus vector was developed wherein all genes encoding enzymes or proteins required to replicate were eliminated. However, such viruses pose purification problems as they require the presence of a suitable helper virus. (Jounaidi, Y, Curr Cancer Drug Targets. 2007, 7(3), 285-301).

In cancer therapy, oncolytic viruses such as Conditionally Replicating Adenoviruses (CRAds) have become a powerful tool in selectively targeting cancer cells. This effect can be achieved in different ways.

First of all, specific mutations, such as deletion of 24 base pairs in the E1a gene (AdΔ24) or deletion of the E1b-55 kDa gene (AdΔ1520), can be introduced in the viral DNA, which lead to the prohibition of replication of the CRAd in healthy cells, whereas in cancer cells this mutation is compensated for by cellular defects, leading to replication of the virus and consequently causing lysis of the cancer cell.

Alternatively, the E1 genes can be placed under a cancer-specific promoter to render controlled transcription of the E1 region, leading to selective replication of the virus particles only in cancer cells. (Yamamoto, M, Curiel, D. T., Molecular Therapy 2010, 18 (2), 243-250)

Furthermore, upon lysis of the cancer cell oncolytic virus particles are released that can subsequently infect neighboring (non-infected) cancer cells. This phenomenon is known as the bystander effect and contributes to an improved therapeutic effect. (Lee, C. S., et al., Genes & Diseases, 2017, 4, 43-63)

However, the use of adenovirus vectors for gene therapy is still associated with major drawbacks. For example, due to their large size, "stickiness" to cells, inability to transfer via blood, neutralization by antibodies and binding to/uptake in cells, such as erythrocytes or liver macrophages, efficient delivery especially to metastasized tumors remains a challenge.

Extracellular vesicles (EVs) are cellular organelles made of a lipid bilayer, typically ranging in size from approximately 50 to 1000 nm that are excreted from cells. They can be formed through the outward budding of the plasma membrane (incl. apoptotic blebs) or through the inward budding of the endosomal membrane, giving multivesicular units that in turn release vesicles upon fusion with the plasma membrane (exosomes). The EVs typically contain different sorts of cargo depending on the donor cell. Such cargo may be treated as waste from the cell and can be disposed off by the EV accordingly, or it may be used for intercellular communication, i.e. by delivery of the cargo from one cell to the other. (van der Pol, E, et al., Pharmacological Reviews, 64 (3), 676-705; Maas, S., et al., Journal of Controlled Release, 2015, 200, 87-96)

Further, tumor-derived EVs were shown in animal models to play a key role in tumor progression and metastasis through active communication with neighboring cells and their local microenvironment. Tumor EVs are thought to affect the immune system homeostasis via several pathways, amongst others through inhibition of CD8+ T cell-mediated targeting of the tumor or suppression of NK cells, thereby creating a protective microenvironment for the tumor. In addition, EVs seem to promote blood vessel recruitment to improve oxygen supply and promote the release of tumor cells into the circulation and their spreading to other sites. (Becker, A., Cancer Cell, 2016, 30, 836-848).

In addition, EVs can be tissue specific depending on their surface protein composition. For example, specific integrins expressed on tumor-secreted EVs account for adhesion to specific cell types. (Hoshino, A., et al, Nature. 2015, 527 (7578): 329-335; Costa-Silva, B, Nat Cell Biol. 2015, 17(6): 816-826).

Because of their natural capacity of transferring biological contents into recipient cells and their target-specificity, the interest in exploiting EVs as therapeutic vehicles has emerged in recent years. In fact, the use of EVs as therapeutic vehicles offers numerous benefits. Due to their natural occurrence in biological systems they are able to penetrate deeper into tissues, thereby improving delivery efficiency. Furthermore, they are able to pass the blood-brain-barrier and may thus be used as delivery vehicles for targets residing in the brain.

Additionally, EVs are able to hide from the immune system, thereby reducing clearance of the EV from the system and EVs do not induce an immunogenic response.

However, reliable and reproducible methods to efficiently load EVs and to package large DNA constructs have not yet been established. Generally, electroporation or sonication is used to introduce small nucleic acids (e.g. short hairpin RNAs) into EVs. These methods are inefficient and studies have even reported that such strategies not lead to true packaging inside the EVs but merely to aggregation on the outside. (Kooijmans et al. J Control Release. 2013 Nov. 28; 172(1):229-238).

Thus, a vehicle that exhibits improved delivery properties and reduced toxicity compared to adenovirus vectors, but with similar packing efficiency and capacity to load large DNA fragments is still needed.

SUMMARY OF THE INVENTION

The inventors surprisingly found that when infecting cells with an adenovirus a new particle, named "adenosome" can be obtained, consisting of cellular vesicles loaded with the adenovirus core-fraction, that is, the viral genome in combination with the viral core proteins. Adenosomes combine the advantageous properties of cellular vesicles with those of adenoviruses.

Accordingly, the invention provides a recombinant adenoviral nucleic acid, comprising a mutation in the early genes, wherein the gene encoding protein V and/or the gene encoding protein VII is placed under control of a heterologous promoter. In a preferred embodiment, the mutation is a Δ24 mutation in the E1a region and/or a Δ55 k mutation in the E1b region. In a further preferred embodiment, the recombinant adenoviral nucleic acid is an adenoviral nucleic acid of a conditionally replicating adenovirus and/or a replication-deficient adenoviral vector. It is further preferred that in a recombinant adenoviral nucleic acid, comprising a mutation in the early genes according to the invention, the gene encoding protein V and the gene encoding protein VII are placed under control of a heterologous promoter. In one embodiment a heterologous gene may be inserted in the recombinant adenoviral nucleic acid. In a further aspect, the invention provides a cellular vesicle comprising such recombinant adenoviral nucleic acid comprising a mutation in the early genes, wherein the gene encoding protein V and/or the gene encoding protein VII is placed under control of a heterologous promoter according the invention. In a preferred embodiment, the cellular vesicle is an extracellular vesicle or a vesicle derived from lysed cells, preferably MSCs, and comprising components from the plasma membrane of said cells. In a particularly preferred embodiment, the cellular vesicle is an extracellular vesicle. In one embodiment, the recombinant adenoviral nucleic acid comprising a mutation in the early genes comprises both the genes encoding protein V and/or protein VII placed under control of a heterologous promoter and the genes encoding V and/or protein VII under control of the original promoter, i.e. a late adenoviral promoter. Alternatively, the recombinant adenoviral nucleic acid comprising a mutation in the early genes comprises only the genes encoding protein V and/or protein VII placed under control of a heterologous promoter but does not comprise the genes encoding V and/or protein VII under control of the original promoter, i.e. a late adenoviral promoter. In a preferred embodiment, the adenoviral nucleic acid comprising a mutation in the early genes and wherein the gene encoding protein V and/or the gene encoding protein VII is placed under control of a heterologous promoter is mutated in such a way that it is no longer capable of producing one or more of the major capsid proteins. In another preferred embodiment, one or more of the late genes encoding the major capsid proteins are partly or completely deleted from the nucleotide sequence of the adenoviral nucleic acid comprising a mutation in the early genes and wherein the gene encoding protein V and/or the gene encoding protein VII is placed under control of a heterologous promoter. In another embodiment one or more of the late genes of the adenoviral nucleic acid comprising a mutation in the early genes and wherein the gene encoding protein V and/or the gene encoding protein VII is placed under control of a heterologous promoter are placed under control of an expression regulator, preferably a Tet-On or Tet-Off system for doxycycline-controllable gene expression. In another preferred embodiment, the adenoviral nucleic acid comprising a mutation in the early genes and wherein the gene encoding protein V and/or the gene encoding protein VII is placed under control of a heterologous promoter is mutated in such a way that it is no longer capable of being packaged in adenovirus capsids, preferably by flanking the adenovirus packaging sequence (psi) by loxP sites to establish Cre recombinase-based deletion of said sequence.

In a further aspect, the invention provides a cellular vesicle comprising a recombinant adenoviral nucleic acid wherein the gene encoding protein V and/or the gene encoding protein VII is placed under control of a heterologous promoter. In a preferred embodiment, the cellular vesicle is an extracellular vesicle or a vesicle derived from lysed cells, preferably MSCs, and comprising components from the plasma membrane of said cells. In a particularly preferred embodiment, the cellular vesicle is an extracellular vesicle. In one preferred embodiment, said nucleic acid does not comprise the early adenoviral genes and does not comprise the genes encoding viral capsid proteins. In a particularly preferred embodiment, said nucleic acid does not comprises adenoviral nucleic acid other than the genes encoding protein V and/or protein VII. It is further preferred that in the recombinant adenoviral nucleic acid the gene encoding protein V and the gene encoding protein VII are placed under control of a heterologous promoter. In one embodiment said cellular vesicle comprising a recombinant adenoviral nucleic acid wherein the gene encoding protein V and/or the gene encoding protein VII is placed under control of a heterologous promoter further comprises a heterologous gene or a second adenoviral nucleic acid comprising a mutation in the early genes, preferably wherein the mutation is a Δ24 mutation in the E1a region and/or a Δ55 k mutation in the E1b region and/the recombinant adenoviral nucleic acid is an adenoviral nucleic acid of a conditionally replicating adenovirus and/or a replication-deficient adenoviral vector. Said recombinant adenoviral nucleic acid wherein the gene encoding protein V and/or the gene encoding protein VII is placed under control of a heterologous promoter and said second adenoviral nucleic acid comprising a mutation in the early genes may be present on the same nucleic acid molecule or on two separate nucleic acid molecules. In a preferred embodiment, the adenoviral nucleic acid comprising a mutation in the early genes and wherein the gene encoding protein V and/or the gene encoding protein VII is placed under control of a heterologous promoter is mutated in such a way that it is no longer capable of producing one or more of the major capsid proteins. In another preferred embodiment, one or more of the late genes encoding the major capsid proteins are partly or completely deleted from the nucleotide sequence of the adenoviral nucleic acid comprising a mutation in the early genes and wherein the gene encoding protein V and/or the gene encoding protein VII is placed under control of a heterologous promoter. In another embodiment one or more of the late genes of the adenoviral nucleic acid comprising a mutation in the early genes and wherein the gene encoding protein V and/or the gene encoding protein VII is placed under control of a heterologous promoter are placed under control of an expression regulator, preferably a Tet-On or Tet-Off system for doxycycline-controllable gene expression. In another preferred embodiment, the adenoviral nucleic acid comprising a mutation in the early genes and wherein the gene encoding protein V and/or the gene encoding protein VII is placed under control of a heterologous promoter is mutated in such a way that it is no longer capable of being packaged in adenovirus capsids, preferably by flanking the adenovirus packaging (psi) by loxP sites to establish Cre recombinase-based deletion of said sequence. Said recombinant adenoviral nucleic acid wherein the gene encoding protein V and/or the gene encoding protein VII is placed under control of a heterologous promoter and said heterologous gene may be also present on the same nucleic acid molecule or on two separate nucleic acid molecules.

In a further aspect, the invention provides a cellular vesicle comprising a recombinant adenoviral nucleic acid wherein the gene encoding protein V and/or the gene encoding protein VII is placed under control of a heterologous promoter and wherein protein V and/or protein VII is fused with a heterologous molecule, in particular encoding a therapeutic protein, imaging protein or protein allowing purification. In a preferred embodiment, the cellular vesicle is an extracellular vesicle or a vesicle derived from lysed cells, preferably MSCs, and comprising components from the plasma membrane of said cells. In a particularly preferred embodiment, the cellular vesicle is an extracellular vesicle. In a preferred embodiment, said nucleic acid does not comprise the early adenoviral genes and does not comprise the genes encoding viral capsid proteins. In a particularly preferred embodiment, said nucleic acid does not comprises adenoviral nucleic acid other than the genes encoding protein V and/or protein VII. It is further preferred that in the recombinant adenoviral nucleic acid the gene encoding protein V and the gene encoding protein VII are placed under control of a heterologous promoter. Protein V and/or VII can be fused directly to the heterologous molecule, preferably heterologous protein or, alternatively, a linker sequence may present between protein V/protein VII and the heterologous molecule. Suitable linkers for fusion of two protein and/or peptide sequences are well known in the art.

In a further aspect, the invention provides a cellular vesicle comprising adenovirus protein V and/or protein VII and a nucleic acid molecule comprising a recombinant adenoviral nucleic acid comprising a mutation in the early genes. In a preferred embodiment, the cellular vesicle is an extracellular vesicle or a vesicle derived from lysed cells, preferably MSCs, and comprising components from the plasma membrane of said cells. In a particularly preferred embodiment, the cellular vesicle is an extracellular vesicle. In a preferred embodiment, the cellular vesicle comprises protein V and protein VII. In a preferred embodiment, the mutation is a Δ24 mutation in the E1a region and/or a Δ55 k mutation in the E1b region. In a further preferred embodiment, the recombinant adenoviral nucleic acid is an adenoviral nucleic acid of a conditionally replicating adenovirus and/or a replication-deficient adenoviral vector. In a preferred embodiment, the adenoviral nucleic acid comprising a mutation in the early genes and wherein the gene encoding protein V and/or the gene encoding protein VII is placed under control of a heterologous promoter is mutated in such a way that it is no longer capable of producing one or more of the major capsid proteins. In another preferred embodiment, one or more of the late genes encoding the major capsid proteins are partly or completely deleted from the nucleotide sequence of the adenoviral nucleic acid comprising a mutation in the early genes and wherein the gene encoding protein V and/or the gene encoding protein VII is placed under control of a heterologous promoter. In another embodiment one or more of the late genes of the adenoviral nucleic acid comprising a mutation in the early genes and wherein the gene encoding protein V and/or the gene encoding protein VII is placed under control of a heterologous promoter are placed under control of an expression regulator, preferably a Tet-On or Tet-Off system for doxycycline-controllable gene expression. In another preferred embodiment, the adenoviral nucleic acid comprising a mutation in the early genes and wherein the gene encoding protein V and/or the gene encoding protein VII is placed under control of a heterologous promoter is mutated in such a way that it is no longer capable of being packaged in adenovirus capsids, preferably by flanking the adenovirus packaging (psi) by loxP sites to establish Cre recombinase-based deletion of said sequence. In one embodiment a heterologous gene may be inserted in the recombinant adenoviral nucleic acid. It is further preferred that in a recombinant adenoviral nucleic acid the gene encoding protein V and the gene encoding protein VII are placed under control of a heterologous promoter.

In a further aspect, the invention provides a cellular vesicle comprising adenoviral protein V and/or protein VII and a nucleic acid molecule comprising a heterologous gene. In a preferred embodiment, the cellular vesicle comprises both protein V and protein VII. In a preferred embodiment, the cellular vesicle is an extracellular vesicle or a vesicle derived from lysed cells, preferably MSCs, and comprising components from the plasma membrane of said cells. In a particularly preferred embodiment, the cellular vesicle is an extracellular vesicle.

In a further aspect, the invention provides a cellular vesicle comprising adenoviral protein V and/or protein VII wherein protein V and/or protein VII is fused with a heterologous molecule, in particular a therapeutic protein, imaging protein or protein allowing purification. In a preferred embodiment, the cellular vesicle is an extracellular vesicle or a vesicle derived from lysed cells, preferably MSCs, and comprising components from the plasma membrane of said cells. In a particularly preferred embodiment, the cellular vesicle is an extracellular vesicle. In a preferred embodiment, the cellular vesicle comprises both protein V and protein VII, wherein protein V and/or protein VII is fused with a heterologous molecule, preferably wherein both protein V and protein VII are fused with a heterologous molecule. The heterologous molecule fused with protein V and the heterologous molecule fused with protein VII can be the same or different. Protein V and/or VII can be fused directly to the heterologous molecule, preferably heterologous protein or, alternatively, a linker may present between protein V/protein VII and the heterologous molecule. Suitable linkers for fusion of two protein and/or peptide sequences are well known in the art. The cellular vesicles may further comprise a recombinant adenoviral nucleic acid, comprising a mutation in the early genes according to the invention, optionally wherein the gene encoding protein V and/or the gene encoding protein VII is placed under control of a heterologous promoter.

In a further aspect, the invention provides a nucleic acid molecule comprising a recombinant adenoviral nucleic acid according to the invention, such as a nucleic acid vector or plasmid. In one embodiment, said recombinant adenoviral nucleic acid is a recombinant adenoviral nucleic acid comprising a mutation in the early genes, wherein the gene encoding protein V and/or the gene encoding protein VII is placed under control of a heterologous promoter. In another embodiment, said recombinant adenoviral nucleic acid is a recombinant adenoviral nucleic acid wherein the gene encoding protein V and/or the gene encoding protein VII is placed under control of a heterologous promoter, and that preferably does not comprise the early adenoviral genes and does not comprise the genes encoding viral capsid proteins, more preferably does not comprises adenoviral nucleic acid other than the genes encoding protein V and/or protein VII.

In a further aspect, the invention relates to a recombinant adenoviral nucleic acid wherein the gene encoding protein V and/or the gene encoding protein VII is placed under control of a heterologous promoter, preferably chosen from an early adenoviral promoter, an intermediate promoter of protein IX or a heterologous promoter of non-adenoviral origin, such as phosphoglycerate kinase (PGK) or cytomegalovirus promoter.

Also part of the invention is a recombinant adenoviral nucleic acid as defined above, wherein the nucleic acid of the virus is mutated in such a way that it is no longer capable of producing one or more of the major capsid proteins, preferably wherein one or more of the late genes encoding the major capsid proteins are partly or completely deleted from the nucleotide sequence or wherein one or more of the late genes are placed under control of an expression regulator, such as a Tet-On or Tet-Off system for doxycycline-inducible or -controllable gene expression.

Alternatively, the invention relates to a recombinant adenoviral nucleic acid, wherein the adenoviral nucleotide sequence is mutated in such a way that it is no longer capable of producing one or more of the major capsid proteins, preferably wherein one or more of the late genes encoding the major capsid proteins are partly or completely deleted from the nucleotide sequence or wherein one or more of the late genes are placed under control of an expression regulator, such as a Tet-On or Tet-Off system for doxycycline-inducible or -controllable gene expression. In such a recombinant adenoviral nucleic acid according to claims 8-10, wherein the gene encoding protein V and/or the gene encoding protein VII is placed under control of a heterologous promoter preferably chosen from an early adenoviral promoter, an intermediate promoter of protein IX or a heterologous promoter of non-adenoviral origin, such as phosphoglycerate kinase (PGK) or cytomegalovirus promoter.

In another embodiment in the recombinant adenoviral nucleic acid of the present invention protein V and/or protein VII is fused with a heterologous molecule, preferably protein, in particular a therapeutic or imaging protein or protein allowing purification or nucleic acid molecule encoding a therapeutic or imaging protein or protein allowing purification. In a preferred embodiment, the heterologous molecule is selected from the group comprising green fluorescent protein, red fluorescent protein, iron dioxide, SNAP tags, biotinylation sequence.

In a further preferred embodiment of the invention the recombinant adenoviral nucleic acid has a heterologous gene inserted, preferably wherein the heterologous gene is encoding a biomolecule selected from the group comprising prodrug-converting enzymes, preferably thymidine kinase, cytokines, preferably GM-CSF, IL-2 or IL-12, checkpoint inhibitors, preferably targeting CTLA-4 or PD-1, agonistic antibodies or ligands to stimulate immune cells, preferably targeting 4-1BB, OX40 or CD40, recombinant bispecific T cell engager antibodies, preferably BiTEs, microRNAs, shRNS, Cas9-guideRNA, peptides to inhibit protein kinases and peptides to stimulate anti-tumor immune responses.

In a further preferred embodiment the invention comprises a recombinant adenoviral nucleic acid as described above, comprising a mutation in the early genes, preferably a $\Delta 24$ mutation in the E1a region or and/a $\Delta 55$ k mutation in the E1b region. Also preferred is a recombinant adenoviral nucleic acid according to the invention comprising an RGD sequence fused to the fiber protein.

Also part of the invention is a cell comprising a recombinant adenoviral nucleic acid according to the invention or a nucleic acid molecule according to the invention, preferably a HER911, PER.C6 or HEK293T cell.

Further part of the invention is a method for the production of a cell according to the invention, comprising
    culturing cells in medium;
    introducing a recombinant adenoviral nucleic acid as described above into said cells.

Further part of the invention is a recombinant adenovirus particle comprising the recombinant adenovirus nucleic acid according to the invention.

Also comprised in the present invention is a cellular vesicle, preferably an extracellular vesicle or vesicle derived from lysed cells, preferably MSCs, and comprising components from the plasma membrane of said cells, more preferably an extracellular vesicle, comprising a recombinant adenoviral nucleic acid according to the invention or a nucleic acid molecule according to the invention. Also comprised in the present invention is a cellular vesicle, preferably an extracellular vesicle or vesicle derived from lysed cells, preferably MSCs, and comprising components from the plasma membrane of said cells, more preferably an extracellular vesicle, filled with the recombinant adenoviral nucleic acid according to the invention. Preferably, such a cellular vesicle comprising or filled with the recombinant adenoviral nucleic acid is for use in the treatment of disease, preferably wherein the disease is cancer or wherein the disease is a genetic disorder, in particular genetic disorders of the brain, liver or gastro-intestinal tract or wherein the disease is chosen from ageing-related diseases, preferably Alzheimer's disease, Parkinson's disease or arthritis or wherein the disease is an infectious disease.

In a further embodiment the cellular vesicle, preferably an extracellular vesicle or vesicle derived from lysed cells, preferably MSCs, and comprising components from the plasma membrane of said cells, more preferably an extracellular vesicle, comprising or filled with the recombinant adenoviral nucleic acid is for use in monitoring viral replication.

The present invention also comprises a therapeutic composition comprising a cellular vesicle, preferably an extracellular vesicle or vesicle derived from lysed cells, preferably MSCs, and comprising components from the plasma membrane of said cells, more preferably an extracellular vesicle, according to the invention or a recombinant adenovirus particle according to the invention and a pharmaceutical carrier or vesicle.

Further part of the present invention is the use of a cellular vesicle, preferably an extracellular vesicle or vesicle derived from lysed cells, preferably MSCs, and comprising components from the plasma membrane of said cells, more preferably an extracellular vesicle, according to the invention as a dye for in vitro tissue or cell cultures and organoids.

The invention further comprises a method for producing an extracellular vesicle according to the invention, comprising:
  culturing cells in a medium;
  introducing a recombinant adenoviral nucleic acid according to the invention into said cells;
  harvesting the extracellular vesicle comprising or filled with recombinant adenoviral nucleic acid.

In a further aspect, the invention provides a method for preparing an extracellular vesicle, comprising
  culturing cells in a medium;
  introducing a recombinant adenoviral nucleic acid wherein the gene encoding protein V and/or the gene encoding protein VII is placed under control of a heterologous promoter into the cells;
  introducing a recombinant adenoviral nucleic acid, comprising a mutation in the early genes and/or a heterologous gene into the cells;
  optionally subjecting the cells comprising the recombinant adenoviral nucleic acid to cell stress;
  harvesting the extracellular vesicle.

Further, the invention relates to a method for the treatment of disease, in particular genetic disorders, cancer or ageing diseases, comprising:
  administration of a cellular vesicle, preferably an extracellular vesicle or vesicle derived from lysed cells, preferably MSCs, and comprising components from the plasma membrane of said cells, more preferably an extracellular vesicle, according to the invention or a therapeutic composition according to the invention to a subject in need thereof.

The invention further comprises a diagnostic method for the detection of adenoviral nucleic acid, comprising:
  administration of a recombinant adenovirus according to the invention or a cellular vesicle filled with recombinant adenoviral nucleic acid according to the invention to a subject in need thereof,
  harvesting of body fluids from said subject;
  quantifying the adenoviral nucleic acid in cellular vesicles. In a preferred embodiment, the cellular vesicle is an extracellular vesicle or a vesicle derived from lysed cells, preferably MSCs, and comprising components from the plasma membrane of said cells. In a particularly preferred embodiment, the cellular vesicle is an extracellular vesicle.

LEGENDS TO THE FIGURES

FIG. 1—Detection of adenoviral core proteins V and VII inside EVs by mass-spectrometry. GS184 glioblastoma cells were infected with wild-type HAdV-5. A: Ultracentrifugation in an iodixanol density gradient was used to isolate EVs and to separate these from adenovirus particles (method developed in-house). B: Western blotting confirmed appropriate separation of EVs (anti-Rab27b staining) from virus particles (anti-fiber staining). C: Mass spectrometry was performed to compare the protein profiles of the cells, virus and EVs. As expected, both viral capsid and core proteins were detected in the cells and virus. However, the EVs appeared to exclusively contain the core proteins (V and VII), which were abundantly present.

Figure 2:
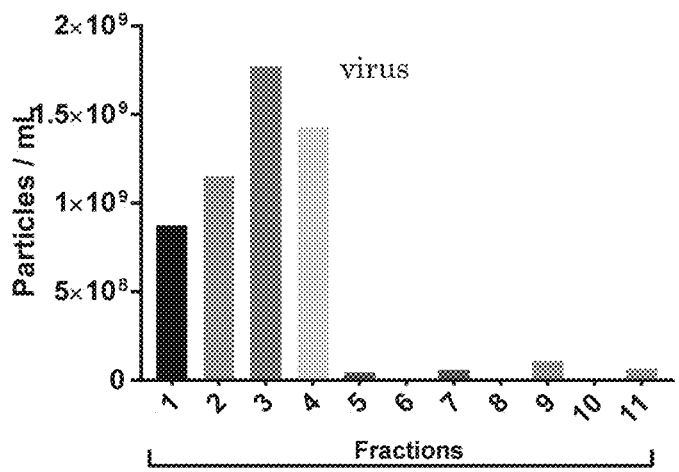
Figure 2:
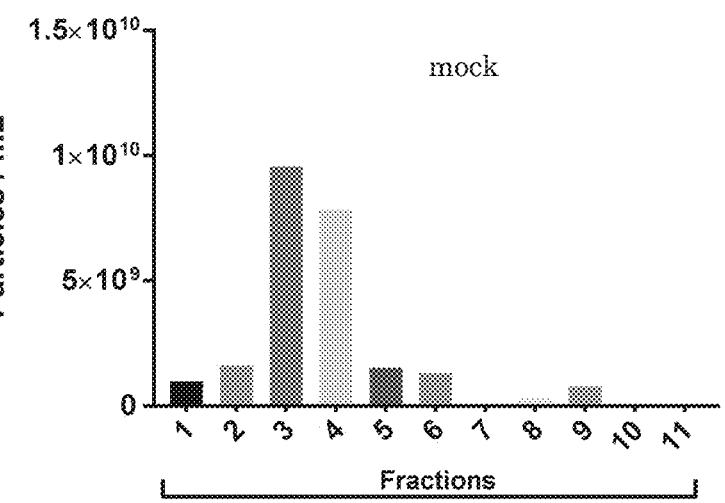
Figure 2:
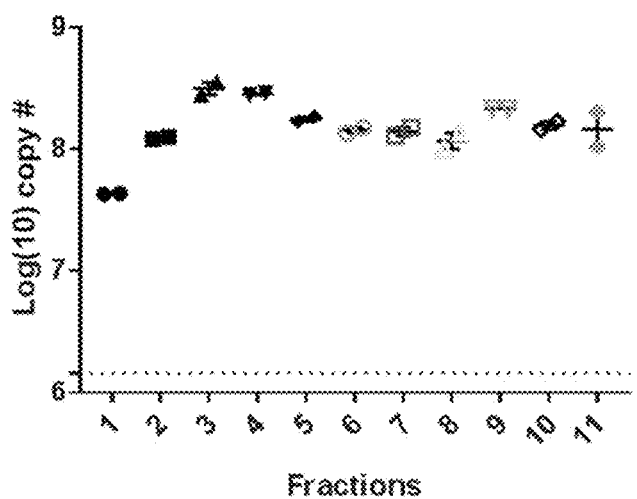
Figure 2:
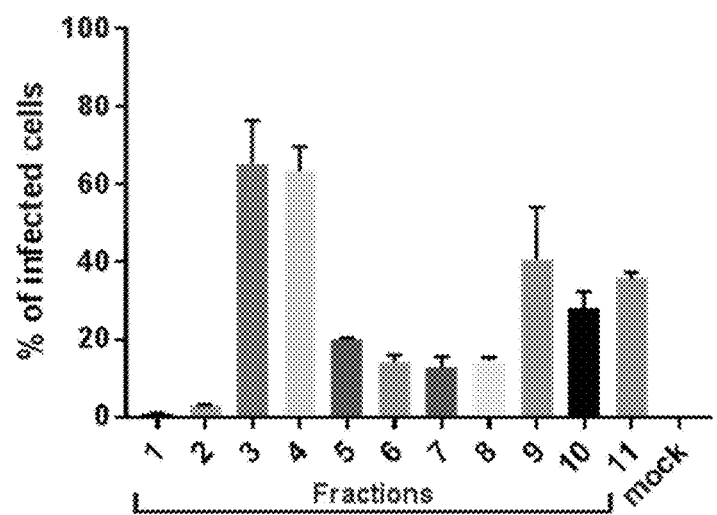

FIG. 2—The EVs from adenovirus infected cells appear to contain viral DNA and appear to be infectious. GS756 cells were infected with a conditionally-replicative adenovirus (Ad.5.d24.RGD.GFP) and after 72 h the supernatant was subjected to iodixanol density gradient centrifugation to separate EVs (top region) from viral particles (bottom region). The different fractions were subjected to different assays: A. EV-Quant assay showing EVs in the top fractions, B. Quantitative PCR (targeting a sequence of the viral fiber gene) showing presence of viral DNA in the bottom (as expected), but also at the top, C. Infectivity assay on A549 cells, which showed the ability of the EVs to infect cells.

Figure 3:
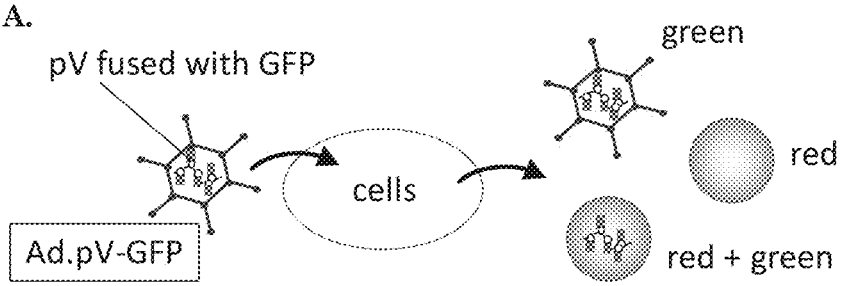
Figure 3:
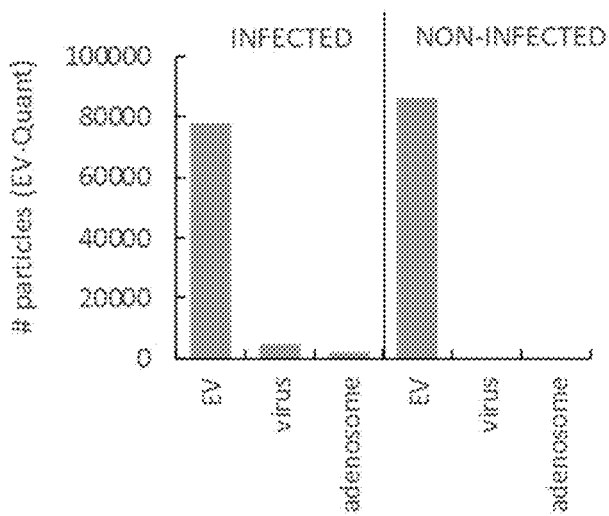
Figure 3:
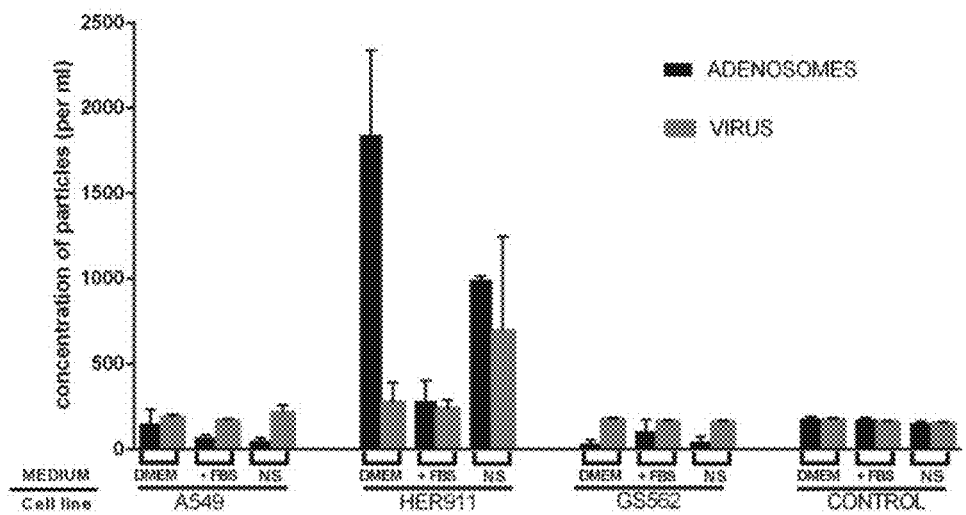
Figure 3:
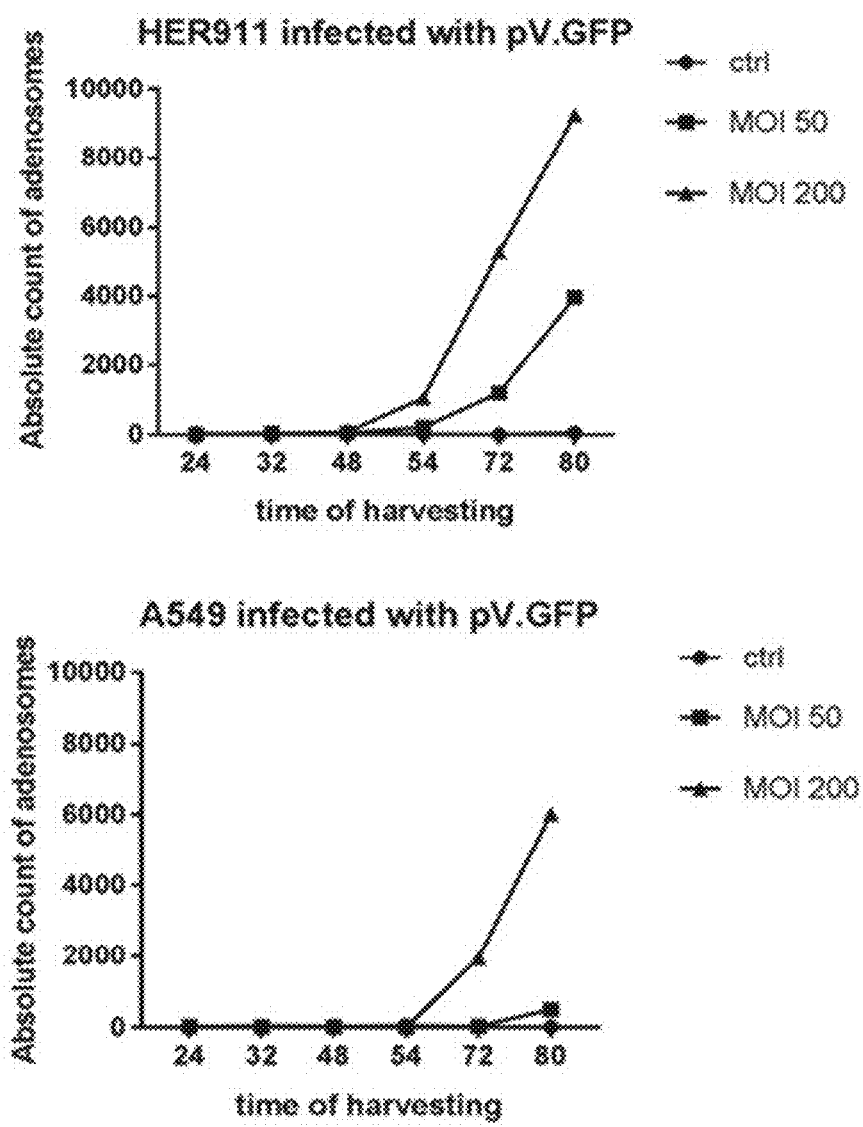

FIG. 3—Detection of pV fused to GFP in EVs after infecting cells with a pV.GFP adenovirus. A: Using our in-house developed EV-Quant assay not only red-fluorescent particles could be detected (labeled EV membranes), but also green-fluorescent particles are visualized. As a consequence, three types of particles were detected: green-only particles=virus particles, red-only particles=empty EVs, red+green particles=EVs loaded with pV.GFP (Adenosomes). B: At 64 h post infection of GS184 cells, substantial amounts of adenosomes were detected in the supernatant. C: Adenosome secretion occurs for different cell types (GS562, HER911, A549). The type of culturing medium can affect the adenosome secretion, e.g. with increased yields of EVs for HER911 cells cultured in DMEM without serum. D: Adenosome concentration in the supernatant of cells increases over time.

Figure 4:
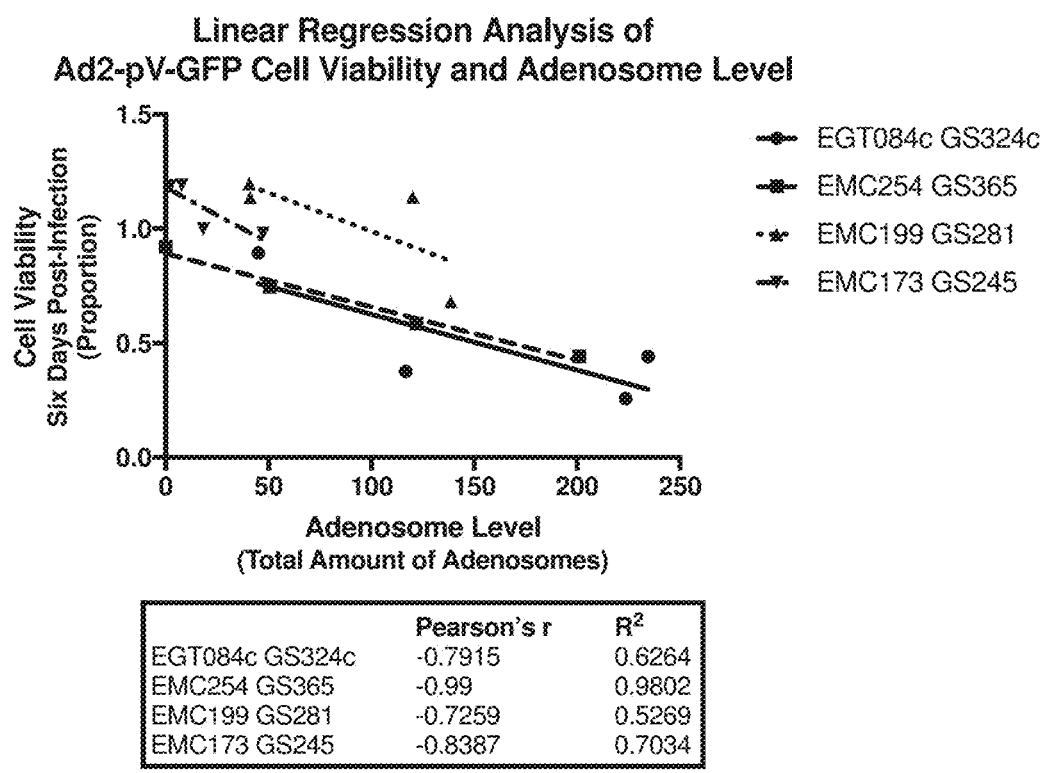
Figure 4:
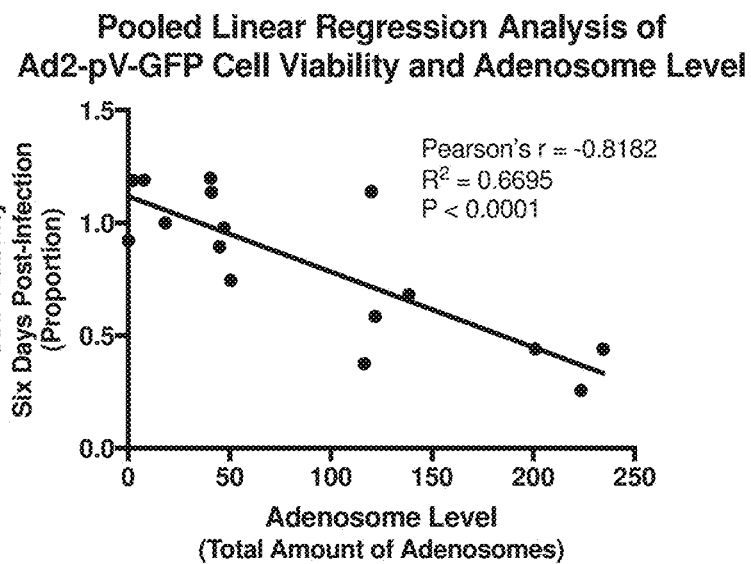

FIG. 4—After infecting cancer cells the adenosome levels correlate with the infectivity levels of the adenovirus. This opens opportunities for adenosomes as biomarker platform. A: After infecting four different primary glioblastoma cultures with the pV.GFP adenovirus, adenosome levels were determined by EVQuant assay on supernatants (six days post-infection). Cell viability was determined with an ATP-based cell viability assay. B: Pooled linear regression analysis of adenosome concentration and cell viability. Both graphs show strong negative correlation between the adenosome concentration and the cell viability.

Figure 5:
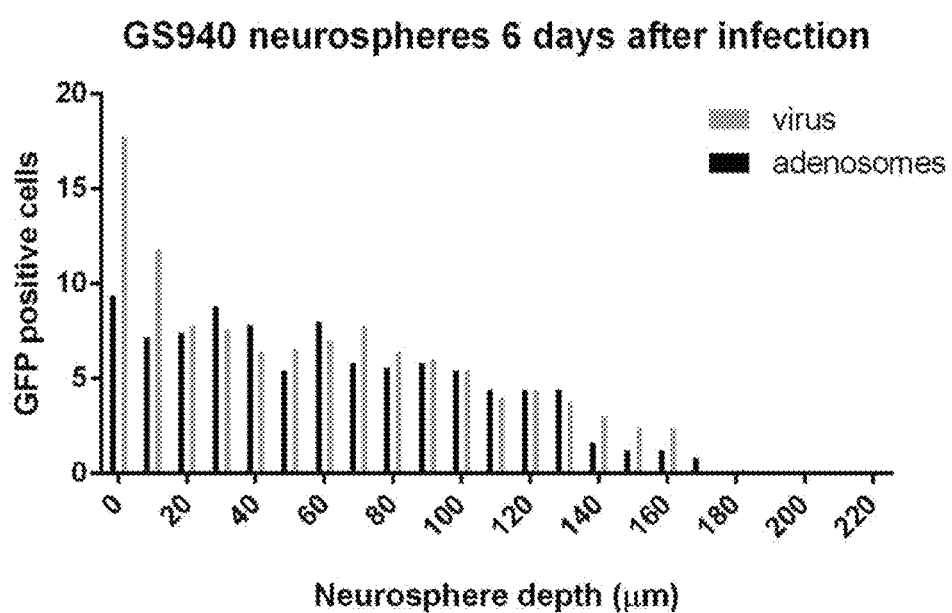

FIG. 5—Comparing tissue penetration of adenosomes and viral particles on glioblastoma neurospheres. Adenosomes and viral particles were isolated from HER911 cells infected with HAdV-5Δ24.RGD.GFP using the iodixanol density gradient procedure. Adenosomes and viral particles were applied with equal infectious units to GS neurospheres. After six days confocal microscopy was performed to analyze GFP expression in the spheres. The average number of GFP positive cells at different depths of the neurospheres is indicated (5 spheres per condition).

Figure 6:
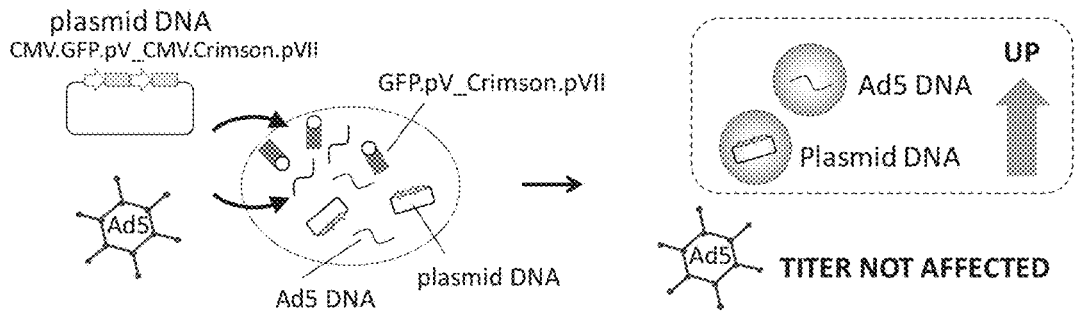
Figure 6:
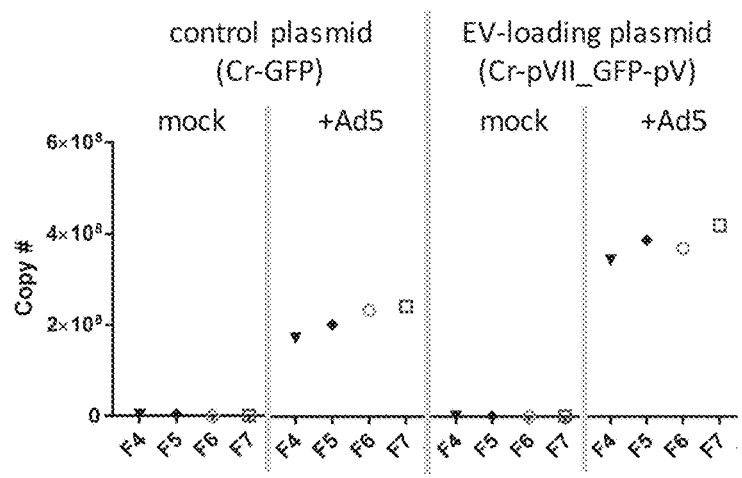
Figure 6:
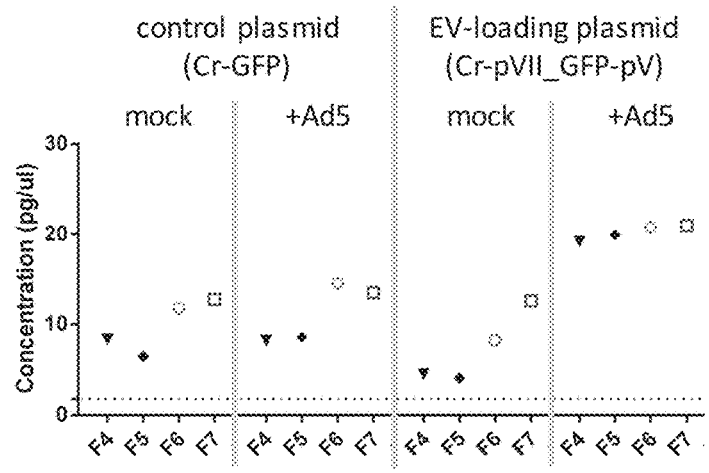

FIG. 6—A: Heterologous expression of pV.pVII results in enhanced incorporation of DNA into EVs. HER911 cells were transfected with plasmid DNA: pUC57.CMV.Crimson_CMV.eGFP (empty-plasmid) or pUC57.CMV.Crimson-pVII_CMV.eGFP-pV (EV-loading plasmid). One day later, the cells were infected with adenovirus (wild-type HAdV-5) and after three days EVs were isolated by the iodixanol density-gradient procedure (EVs in fractions 4 to 7). B: Q-PCR was used to quantify the incorporation of DNA in the EVs. This clearly showed that the heterologous expression of pV/pVII further boosted the incorporation of the viral genome DNA (upper Figure). Moreover, also pUC57 DNA was incorporated at increased levels into the EV, in the context of pV/pVII expression plus viral infection (lower Figure).

DETAILED DESCRIPTION

It was found that when a cell is infected with an adenovirus it secretes extracellular vesicles, comprising adenoviral material that may be used as delivery vehicle of biological substances (Aksela, L, University of Helsinki, Delivery of oncolytic adenovirus via extracellular vesicles, Dourado, M. R., et al., Journal of Extracellular Vesicles, 2017, 6 (supp 1), extracellular vesicles derived from cancer-associated fibroblasts may have a role in oral cancer invasion; Garofalo, M., Journal of Extracellular Vesicles, 2017, 6 (supp 1), Oncolytic adenoviruses encapsulated into the extracellular vesicles as carriers for targeted drug delivery, Garofalo, M., J Control Release. 2018, 283, 223-234.)

The inventors now surprisingly found that cellular vesicles, such as, extracellular vesicles, termed "adenosomes", have unique properties that are of great therapeutic value, for example in the delivery of biological cargo to a target cell. This finding is surprising because extracellular vesicles typically exhibit a limited packing capacity. When evaluating these adenosomes in detail, it was observed that the adenosomes were packaged with viral DNA bound to the viral core proteins V and VII, whereas the capsid proteins, such as the hexon, penton and fiber proteins, where absent. Thus, the inventors realized that the proteins V and VII play a crucial role in the tightly packing of the viral DNA such that it fits in the extracellular vesicle. Indeed, as demonstrated in FIG. 6B a nucleic acid comprising the genes encoding pV and pVII is able to increase incorporation of adenoviral DNA into an extracellular vesicle (upper Figure).

It was further envisaged that an adenovirus with the potential of being efficiently packed into a cellular vesicle would be of great therapeutic value. Thus, the invention relates to a recombinant adenoviral nucleic acid wherein the gene encoding protein V and/or the gene encoding protein VII is placed under control of a heterologous promoter. A recombinant adenoviral nucleic acid according to the invention may be an adenoviral nucleic acid having one or both of the genes encoding protein V and protein VII, i.e. it may be a full length adenoviral nucleic acid or it may only be the gene encoding one of those two proteins. Further, it may include additional mutations and/or deletions with respect to the naturally occurring adenovirus.

Thus, the invention encompasses several aspects. In one aspect, the invention relates to a new type of oncolytic adenovirus with increased secretion of its genome in cellular vesicles by enhanced or earlier expression of pV and/or pVII, providing improved cancer-killing adenoviruses with improved spread and killing. This new type of adenovirus may be an adenovirus, having a mutation in the early genes and wherein the gene encoding pV and/or pVII is placed under control of a heterologous promoter, either while leaving the original pV and/or pVII intact or with inoperative or deleted original pV and/or pVII. Alternatively, pV and/or pVII, placed under the control of a heterologous promoter, and an oncolytic adenovirus are provided separately but in combination. Such adenoviruses have expression of pV and/or pVII early in the cell and promote packaging of the adenoviral nucleic acid into a cellular vesicle.

In another aspect, the invention relates to the use of pV and/or pVII to load cellular vesicles with adenoviral or heterologous DNA or heterologous proteins or peptides, or a combination thereof with, optionally, high-level loading of heterologous protein or peptide sequences into cellular vesicles by fusing these proteins or peptides to pV and/or pVII, providing cellular vesicles as therapeutics for a multitude of disease. The cellular vesicles are excreted upon introduction of for instance two separate recombinant nucleic acid molecules into a cell. One nucleic acid molecule comprises the gene encoding pV and/or pVII, with optional fusion to a sequence for a therapeutic protein, wherein said gene is placed under control of a heterologous promoter. The other nucleic acid molecule comprises an adenoviral nucleic acid having a mutation in the early genes and/or a heterologous gene. When introduced into a cell the producer cells excrete cellular vesicles comprising adenoviral nucleic acid and/or the heterologous gene. Alternatively, use is made of a single nucleic acid molecule comprising both the genes encoding pV and/or pVII, with optional fusion to a sequence for a therapeutic protein, and the adenoviral nucleic acid having a mutation in the early genes and/or the heterologous gene. Without being bound to theory, it is believed that pV and/or pVII are expressed in the cell from the nucleic acid comprising the genes encoding pV and/or pVII, wherein the gene is placed under a heterologous promoter and promote packaging of nucleic acid molecules into the cellular vesicles.

As used herein the term "cellular vesicle" refers to a cell-derived vesicle having a membrane that encloses an internal space. It is for instance produced and/or obtained using a method according to the invention as described herein below, and in the Examples herein.

One preferred example of a cellular vesicle as used herein is an extracellular vesicle. Extracellular vesicles (EVs) are cellular organelles made of a lipid bilayer, typically ranging in size from approximately 50 to 1000 nm that are excreted from cells. They are formed through the outward budding of the plasma membrane (incl. apoptotic blebs) or through the inward budding of the endosomal membrane, giving multivesicular units that in turn release vesicles upon fusion with the plasma membrane (exosomes). Extracellular vesicles can be prepared by culturing appropriate producer cells in a suitable medium, introducing a recombinant adenoviral nucleic acid according to the invention and optionally heterologous gene, into the cells and harvesting extracellular vesicles.

Alternatively, loaded cellular vesicles can also be produced by means of "disrupting cells and vesicle-reformation" protocols, such as described by Hoogduijn et al. 2017 (Gonsalves F D C, Luk F, Korevaar S S, Bouzid R, Paz A H, Lopez-Iglesias C, Baan C C, Merino A, Hoogduijn M J. Membrane particles generated from mesenchymal stromal cells modulate immune responses by selective targeting of pro-inflammatory monocytes. Sci Rep. 2017 Sep. 21; 7(1): 12100) and in WO 2017/204639. Thereby, pV and/or pVII and, e.g. heterologous DNA or oncolytic adenovirus, are expressed in producer cells, such as mesenchymal stem cells (also called mesenchymal stromal cells; MSCs), followed by subsequent cell disruption (e.g. by osmotic shock), removal of cell nuclei, cell fractionation (e.g. by passing through a needle) and re-formation of vesicles. Such cellular vesicles comprise components from the plasma membrane of the producer cells, including lipids and proteins, and have an average particle size of between 70 and 170 nm. MSCs used for preparing such cellular vesicles are preferably derived from adipose tissue, preferably human adipose tissue. Such cellular vesicles according to the invention are for instance prepared by method as described by Hoogduijn et al. 2017, whereby a recombinant adenoviral nucleic acid according to the invention and optionally heterologous gene are introduced into the cells prior to cell disruption.

Hence, in a preferred embodiment, a cellular vesicle according to the invention is an extracellular vesicle or a vesicle derived from lysed cells, preferably lysed MSCs, and comprising components from the plasma membrane of said cells. In a particularly preferred embodiment, the cellular vesicle according to the invention is an extracellular vesicle.

The heterologous promoter may be any kind of promoter that in the naturally occurring situation is not located at that particular place and/or to drive expression of the protein in front of which it is placed. It may be a promoter of a heterologous organism such as from cytomegalovirus or any other constitutive promoter that is functional in adenovirus and/or in the host cell wherein the adenoviral nucleic acid is expressed. Expression of one or both of the proteins V and VII in a cell enables packaging of DNA as well as of pV and/or pVII fused with a therapeutic protein moiety in cellular vesicles.

Alternatively, it may be an adenoviral promoter such as the intermediate promoter pIX or any of the early adenoviral promoters. An early promoter is a promoter that drives the expression of so-called early genes, i.e. genes that are the first to be expressed after a viral infection. By placing genes under the control of an early promoter, during replication of the virus, these genes are transcribed first. Thus, when placing the genes encoding proteins V and VII under control of an early promoter, efficient packing of the viral DNA can be achieved.

When cells are infected with such an adenovirus particle however, the capsid (or coat) proteins, which are redundant for the preparation of adenosomes, are still produced. Accordingly, in another, alternative embodiment, the recombinant adenoviral nucleic acid is mutated in such a way that it is no longer capable of producing one or more of the major capsid proteins. Advantageously, such an adenoviral nucleic acid allows for the production of adenovirus material that does not provoke an immune response.

There are several ways of obtaining a recombinant adenoviral nucleic acid incapable of producing major capsid proteins. For example, the nucleic acid may be mutated such that one or more, preferably all of the late genes encoding the major coat proteins are completely or partly deleted. Adenovirus vectors lacking the genes encoding these major coat proteins render a more efficient system in view of production economics by eliminating the incorporation of viral genome into viral virions and boosting the incorporation into EVs. Furthermore, removing redundant genes from the genome of the adenovirus, leaves a higher capacity for the implementation of heterologous genes.

In an alternative embodiment, transcription of the late genes is reversibly turned on or off via tetracycline-controlled transcriptional activation. In absence of tetracycline, binding of the Tet repressor to Tet operators blocks the expression of the late genes. Such repression is reversed in the presence of tetracycline, or certain derivatives thereof such as doxycycline. Thus the invention also relates to a recombinant adenoviral nucleic acid, wherein one or more of the late genes are placed under control of an expression regulator, preferably a Tet-On or Tet-Off system for doxycycline-inducible, or -controllable, gene expression.

An advantage of such an adenoviral nucleic acid is that expression of late genes may still be utilized, for example in cell cultures, allowing the adenovirus to efficiently replicate, whereas expression of the late genes may be turned off, e.g. when used in a method according to the invention.

Further part of the invention is a recombinant adenoviral nucleic acid according to the invention, wherein the adenoviral nucleic acid is mutated in such a way that it is no longer capable of being packaged in adenovirus capsids. This is preferably achieved by flanking the adenovirus packaging sequence (psi) by loxP sites. This results in Cre recombinase-based deletion of the psi sequence. The Cre-lox recombination is well known in the art and frequently applied in the production of gutless adenovirus constructs. Hence, the skilled person knows how to achieve this. Any method that results in Cre recombinase-based deleted of the packaging genes can be used. A suitable example is described by Parks et al. (Parks R J, Chen L, Anton M, Sankar U, Rudnicki M A, Graham F L. A helper-dependent adenovirus vector system: removal of helper virus by Cre-mediated excision of the viral packaging signal. Proc Natl Acad Sci USA. 1996 Nov. 26; 93(24): 13565-70).

In a preferred embodiment the virus nucleic acid comprises a combination of the above mentioned mutations. Hence, the invention in one embodiment preferably relates to a recombinant adenoviral nucleic acid wherein the gene encoding the core protein V and/or the gene encoding the core protein VII are placed under a heterologous, preferably an early adenoviral promoter, the intermediate protein IX promoter or a promotor from a heterologous organism, in particular cytomegalovirus, to ensure efficient formation of adenosomes and wherein the adenoviral nucleic acid is mutated in such a way that it is no longer capable of producing one or more of the major coat proteins, preferably an adenoviral nucleic acid wherein one or more of the late genes encoding the major capsid proteins are partly or completely deleted or wherein one or more of the late genes are placed under control of an expression regulator, preferably a Tet-On or Tet-Off system for doxycycline-inducible, or controllable gene expression.

As has been discussed in the introduction paragraphs, adenovirus vectors have a proven track record to act as powerful vectors to deliver (large-sized) heterologous genes into cells. This delivery occurs without integration of the viral and heterologous sequences into the host genome, which provides additional safety.

Furthermore, it was shown that adenoviral vectors are efficient vaccine vectors, which outperform common vaccine vectors such as the poxvirus vector, naked DNA vaccines and alpha-virus vectors with regard to inducing a protective immune response. Hence, the invention also relates to adenoviral vectors as vaccine vector for heterologous genes that have the ability to induce a protective immune response in a subject.

There are several methods known in the art to insert a heterologous gene into the adenoviral DNA. For example, this can be achieved by using newer generation gene editing methods (e.g. CRISPR-Cas) and/or using classical recombinant DNA techniques. The skilled person will know how to do this.

The term "heterologous gene" as used herein refers to any gene that is heterologous to adenoviral nucleic acid. In principle any heterologous gene that is considered useful can be inserted, such as genes encoding a molecule with therapeutic effect, genes inducing protective antibody titers or genes encoding a molecule that can be used for reporting (imaging) purposes. In a preferred embodiment, the heterologous gene is encoding a biomolecule selected from the group comprising prodrug-converting enzymes, preferably thymidine kinase, cytokines, preferably GM-CSF, IL-2 or IL-12, checkpoint inhibitors, preferably targeting CTLA-4 or PD-1, agonistic antibodies or ligands to stimulate immune cells, preferably targeting 4-1BB, OX40 or CD40, recombinant bispecific T cell engager antibodies, preferably BiTEs, microRNAs, shRNS, Cas9-guideRNA, peptides to inhibit protein kinases and peptides to stimulate anti-tumor immune responses.

One group of therapeutic genes that has attracted considerable attention is the group of prodrug-activating genes (also called suicide genes). Such genes code for an enzyme that catalyzes the conversion of a (non-toxic) prodrug into a (toxic) drug.

In one embodiment the heterologous gene to be inserted is a gene encoding Herpes simplex virus thymidine kinase (HSV-tk). Transfer of the HSV-tk gene renders the cells sensitive to treatment with substances that have the ability to kill cancer cells, such as ganciclovir.

Thymidine kinase is involved in the phosphorylation of ganciclovir, a nucleotide analogue that becomes cytotoxic upon phosphorylation by blocking DNA replication and thereby selectively killing dividing cells. In addition it was found that the cytotoxic effect of phosphorylated ganciclovir was further spread to not-transfected cells in close proximity. Hence, the administration of HSV-tk gene transfer and ganciclovir is particularly suitable for the treatment of solid tumors. (Sandmair, A-M, et al, Cancer Gene Therapy, 2000, 7 (3), 413-421).

Further, the adenoviral nucleic acids according to the invention and the cellular vesicles, preferably extracellular vesicles or vesicles derived from lysed cells, preferably MSCs, and comprising components from the plasma membrane of said cells, more preferably extracellular vesicles, that comprise or are filled with this material are particularly suitable in the treatment of genetic disorders. These genetic disorders can be either inherited or acquired, but in either case the disorders are caused by an abnormality in the genome. Depending on the abnormality a functional gene can be introduced to either correct or inhibit the defective gene.

Thus the invention also relates to recombinant adenoviral nucleic acids in which a heterologous gene is inserted that is therapeutically active or otherwise beneficial in a genetic disorder.

In particular the invention relates to adenovirus nucleic acids wherein the heterologous gene is encoding a biomolecule selected from the group comprising prodrug-converting enzymes, preferably thymidine kinase or ligands such as peptides inhibiting protein kinases, cytokines, preferably GM-CSF, IL-2 or IL-12, checkpoint inhibitors, preferably targeting CTLA-4 or PD-1, agonistic antibodies or ligands to stimulate immune cells, preferably anti-tumor immune responses, in particular targeting 4-1BB, OX40 or CD40, recombinant bispecific T cell engager antibodies, preferably BiTEs, microRNAs, shRNS, Cas9-guide RNA, coding DNAs to correct for defective genes.

As demonstrated in the examples, proteins V and VII promote incorporation of further nucleic acid molecules in extracellular vesicles. Hence, as an alternative to insertion of the heterologous gene into the adenoviral nucleic acid, a heterologous gene can be provided in combination with, but separately from, the protein V and/or protein VII, preferably protein V and protein VII, or the gene encoding protein V and/or protein VII, preferably protein V and protein VII. In this embodiment, the heterologous gene can be combined with a recominant nucleic acid according to the invention wherein the gene encoding protein V and/or the gene encoding protein VII is placed under control of a heterologous promoter and that does not comprise the early adenoviral genes and does not comprise the genes encoding viral capsid proteins. For instance, the heterologous gene can be combined with a recombinant nucleic acid according to the invention that does not comprises adenoviral nucleic acid other than the genes encoding protein V and/or protein VII placed under control of a heterologous promoter.

Thus, the invention also provides a cellular vesicle, comprising a nucleic acid molecule comprising a recombinant adenoviral nucleic acid, wherein the gene encoding protein V and/or the gene encoding protein VII, preferably protein V and protein VII, is placed under control of a heterologous promoter and a heterologous gene. In one preferred embodiment, said nucleic acid does not comprise the early adenoviral genes and does not comprise the genes encoding viral capsid proteins. In a particularly preferred embodiment, said nucleic acid does not comprises adenoviral nucleic acid other than the genes encoding protein V and/or protein VII. Said heterologous gene may be present on the same nucleic acid molecule, such as a vector or plasmid, as the gene encoding protein V and/or the gene encoding protein VII or the heterologous gene may be present on a different nucleic acid molecule as the nucleic acid molecule comprising the gene encoding protein V and/or the gene encoding protein VII. In a preferred embodiment, the cellular vesicle is an extracellular vesicle or a vesicle derived from lysed cells, preferably MSCs, and comprising components from the plasma membrane of said cells. In a particularly preferred embodiment, the cellular vesicle is an extracellular vesicle.

The invention also relates to a cellular vesicle comprising protein V and/or protein VII and a nucleic acid molecule comprising a heterologous gene. Optionally, said protein V and/or protein VII, preferably protein V and protein VII, is fused with a heterologous molecule, in particular a therapeutic protein, imaging protein or protein allowing purification. This is further detailed herein below. In a preferred embodiment, the cellular vesicle is an extracellular vesicle or a vesicle derived from lysed cells, preferably MSCs, and comprising components from the plasma membrane of said cells. In a particularly preferred embodiment, the cellular vesicle is an extracellular vesicle.

In principle the cellular vesicle can comprise any heterologous gene that is considered useful, as detailed herein above, such as genes encoding a molecule with therapeutic effect, genes inducing protective antibody titers or genes encoding a molecule that can be used for reporting (imaging) purposes.

Another method to deliver a therapeutic biomolecule into a recipient cell is by fusing the viral protein V and/or protein VII to a heterologous protein, in particular a therapeutic protein, an imaging protein, a protein allowing purification, a peptide that inhibit protein kinases, or a peptide that to stimulates anti-tumor immune responses.

The fusion of protein V and/or protein VII to an imaging protein allows for the monitoring of the adenovirus or cellular vesicles comprising the fusion protein in a subject. Basically any imaging protein might be suitable that can be linked to protein V or protein VII. Examples of suitable imagine molecules include green fluorescent protein, red fluorescent protein, affinity tags for magnetic separation, such as iron oxide, SNAP tags or biotinylated sequences. Linking said proteins can be performed by fusing the viral gene for protein V or protein VII with a nucleic acid that codes for the protein of interest. Also, adapter systems can be used, such as the streptavidin-biotin system to couple a protein to protein V or protein VII fused to an adapter tag.

Imaging proteins, either when fused to pV/pVII as described above or expressed as a single protein from the adenoviral vector nucleic acid, e.g. driven by a CMV promotor or a tissue/cell-specific promotor, or even when contained in the same vesicle but separate from the adenoviral sequence(s), can be detected in biological systems due to their fluorescence or magnetism and are thus suitable for detection or diagnosis of diseases or for monitoring distribution of the particles. Hence, such labeled adenoviral nucleic acids are also suitable for use as dyes or labeling molecules. Specifically, these may be used in ex vivo or in vitro systems such as cell and tissue cultures. One promising application is to use the cellular vesicles of the present invention as a dye for labeling of tissue or cell cultures and organoids, i.e. tissue cultured organ-like systems. There they may be applied to localize cell-specific compounds, to identify possible drug targets, to express a fluorescent color in a particular cell type, etc.

The imaging device may be any imaging device that is suitable for detection of the label. For example, to detect fluorescence, fluorescence microscopy, fluorescent-activated cell sorting, or ultraviolet light may be used. Luminescence may be used to detect labels that induce luminescence signals, such as firefly or *Renilla* luciferase. To detect magnetic nanoparticles or proteins, magnetic resonance imaging (MRI) or a suitable stain such as manganese peroxidase may be employed. The label may also be a tag that can be used to pull-down pV and/or pVII together with the associated DNA. This pull-down can be used, for example, to provide a biomarker for the replication of an oncolytic adenovirus.

Hence, another aspect of the invention relates to a diagnostic method for the detection of adenoviral nucleic acid, comprising:
  Administration of recombinant adenovirus nucleic acid according to the invention or a cellular vesicle filled with recombinant adenoviral nucleic acid according to the invention to a subject in need thereof,
  Harvesting a sample of body fluids from said subject;
  Quantifying the adenoviral nucleic acid in cellular vesicles.

The fusion of protein V and/or protein VII to a therapeutic protein allows for production of cellular vesicles comprising the therapeutic protein. Such cellular vesicles can be used in the treatment of various diseases, such as infection diseases, cancer, ageing-related diseases, preferably Alzheimer's disease, Parkinson's disease or arthritis and genetic disorders in particular genetic disorders of the brain, liver, heart and gastro-intestinal tract as further detailed below. Any therapeutic protein can be fused to protein V and/or protein VII. Examples are peptides to inhibit protein kinases and peptides to stimulate anti-tumor immune responses. In a preferred embodiment, said therapeutic protein is a tumor antigen protein or tumor antigen peptide. Cellular vesicles comprising protein V and/or protein VII fused to a tumor-antigen peptide are particularly useful in the treatment of cancer. Tumor antigen peptides are generated by degradation of tumor antigen proteins, which are proteins specific for a tumor. The tumor antigen peptides bind to MHC class I antigens (HLA antigens) which are transported to the cell surface to be presented as an antigen. Tumors can be treated by using tumor antigen proteins or tumor antigen peptides as so-called cancer vaccines to enhance tumor-specific CTLs in a tumor patient. In a preferred embodiment, the cellular vesicles comprises protein V and/or protein VII fused to a therapeutic protein, preferably a tumor antigen protein or tumor antigen peptide, and a recombinant adenoviral nucleic acid, comprising a mutation in the early genes according to the invention, preferably wherein the mutation is a $\Delta 24$ mutation in the E1a region and/or a $\Delta 55$ k mutation in the E1b region, more preferably wherein the recombinant adenoviral nucleic acid is an adenoviral nucleic acid of a conditionally replicating adenovirus and/or a replication-deficient adenovirus vector.

In another embodiment, the invention relates to a recombinant adenoviral nucleic acid, comprising a mutation in the early genes of the nucleotide sequence. Such a mutation may render the virus replication deficient, as is the case for adenovirus particles wherein the E1 region, both the E1 and E2 regions, the E1 and E4, the E1, E2 and E4 or all early genes are deleted. Alternatively, specific mutations in the early genes are known such as the $\Delta 24$ mutation in the E1a gene, which causes specific replication of the virus in only cancer cells. In addition, specific mutations may also include the introduction of organ-specific promoters that render the virus specific for this particular organ, such as the brain or the prostate. Adenovirus particles according to the invention and carrying such a mutation are therefore particularly suitable for use in cancer treatment.

Preferably, the invention relates to a recombinant adenoviral nucleic acid, comprising a $\Delta 24$ mutation in the E1a region and/or a 455 mutation in the E1b region and an adenoviral particle comprising said nucleic acid.

In a further preferred embodiment, the invention relates to a recombinant adenoviral nucleic acid, wherein the recombinant adenoviral nucleic acid is an adenoviral nucleic acid of a conditionally replicating adenovirus and/or a replication-deficient adenovirus vector, in particular an oncolytic adenovirus vector.

In a further embodiment the invention relates to a viral particle comprising a recombinant adenoviral nucleic acid having an integrin-recognition motif such as an RGD sequence (Arg-Gly-Asp) which enables binding of the virus to certain members of the integrin family, which serve as entry receptor for the virus into the (mammalian) cell. Preferably, the RGD sequence is fused to the fiber protein.

Further, the invention relates to cellular vesicles comprising any recombinant adenoviral nucleic acid according to the invention. In one embodiment, the invention also relates to cellular vesicles filled with the recombinant adenoviral nucleic acid according to the invention.

In a preferred embodiment, the cellular vesicle is an extracellular vesicle or a vesicle derived from lysed cells, preferably MSCs, and comprising components from the plasma membrane of said cells. In a particularly preferred embodiment, the cellular vesicle is an extracellular vesicle.

Further preferred is a cellular vesicle comprising a recombinant adenoviral nucleic acid wherein the gene encoding protein V and/or the gene encoding protein VII, preferably the genes encoding protein V and protein VII, is placed under control of a heterologous promoter. Such an EV preferably further comprises a heterologous gene, or, alternatively an adenoviral nucleic acid comprising a mutation in the early genes. Thus, the invention also includes a cellular vesicle, comprising

- a nucleic acid molecule comprising a recombinant adenoviral nucleic acid, wherein the gene encoding protein V and/or the gene encoding protein VII is placed under control of a heterologous promoter and a heterologous gene; or
- a nucleic acid molecule comprising a recombinant adenoviral nucleic acid, wherein the gene encoding protein V and/or the gene encoding protein VII is placed under control of a heterologous promoter and a nucleic acid molecule comprising a heterologous gene.

The invention also relates to a cellular vesicle comprising protein V and/or protein VII, preferably protein V and protein VII; and

- a nucleic acid molecule comprising a recombinant adenoviral nucleic acid comprising a mutation in the early genes; and/or
- a heterologous gene. In a preferred embodiment, the mutation in the in the early genes of the recombinant adenoviral nucleic acid is a mutation is a Δ24 mutation in the E1a region and/or a Δ55 k mutation in the E1b region. In a further preferred embodiment, the recombinant adenoviral nucleic acid is an adenoviral nucleic acid of a conditionally replicating adenovirus and/or a replication-deficient adenoviral vector. In one embodiment, said nucleic acid molecule comprising said recombinant adenoviral nucleic acid comprising a mutation in the early genes further comprises the heterologous gene. In another embodiment, said heterologous gene is present on a different nucleic acid molecule as the nucleic acid molecule comprising comprising a recombinant adenoviral nucleic acid.

In principle the cellular vesicle can comprise any heterologous gene that is considered useful, as detailed herein above, such as genes encoding a molecule with therapeutic effect, genes inducing protective antibody titers or genes encoding a molecule that can be used for reporting (imaging) purposes.

These cellular vesicles (adenosomes) according to the invention constitute several advantages for use as therapeutic delivery vehicle, compared to standard adenovirus vectors. Due to their lipid bilayer coat, delivery of the viral DNA over long distances, deep into the tissue or over the blood-brain-barrier is largely improved. Such effects are amongst others achieved by the fact that the cellular vesicles allow shielding from neutralizing antibodies, hence allowing a longer circulating time in the system.

Further, cellular vesicles are non-immunogenic, hence exhibiting lower toxicity as compared to common virus vectors.

Thus the cellular vesicles of the invention are suitable for the prevention and treatment of various diseases. Examples include infection diseases, cancer, ageing-related diseases, preferably Alzheimer's disease, Parkinson's disease or arthritis and genetic disorders in particular genetic disorders of the brain, liver, heart and gastro-intestinal tract.

Preferably, the cellular vesicles of the invention are used for the treatment or prevention of cancer, genetic disorders, infection diseases or age-related disorders.

Accordingly, the invention also provides in a method for the treatment of disease, in particular genetic disorders, cancer, infection diseases or ageing diseases, comprising:

- administration of a cellular vesicle according to the invention to a subject in need thereof. In a preferred embodiment, the cellular vesicle is an extracellular vesicle or a vesicle derived from lysed cells, preferably MSCs, and comprising components from the plasma membrane of said cells. In a particularly preferred embodiment, the cellular vesicle is an extracellular vesicle.

In the treatment of cancer, the cellular vesicles preferably comprise a conditionally replicating adenovirus and/or a replication-deficient adenovirus vector. In one embodiment, the cellular vesicles comprise a recombinant adenoviral nucleic acid according to the invention which comprises a mutation in the early genes and which is a conditionally replicating adenovirus and/or a replication-deficient adenovirus vector, wherein the gene encoding protein V and/or the gene encoding protein VII is placed under control of a heterologous promoter. In alternative embodiment, the cellular vesicles comprise:

- protein V and/or protein VII or the gene encoding protein V and/or the gene encoding protein VII is placed under control of a heterologous promoter; and
- a recombinant adenoviral nucleic acid comprising a mutation in the early genes, which is a conditionally replicating adenovirus and/or a replication-deficient adenovirus vector. In both alternatives, the mutation in the in the early genes of the recombinant adenoviral nucleic acid is preferably a mutation is a Δ24 mutation in the E1a region and/or a Δ55 k mutation in the E1b region.

Further particularly suitable for treatment of cancer are cellular vesicles according to the invention wherein protein V and/or protein VII are fused to a therapeutic protein, preferably a tumor antigen protein or tumor antigen peptide. Such cellular vesicles may further comprise a recombinant adenoviral nucleic acid, comprising a mutation in the early genes according to the invention, optionally wherein the gene encoding protein V and/or the gene encoding protein VII is placed under control of a heterologous promoter.

In the treatment of infection diseases, ageing-related diseases, preferably Alzheimer's disease, Parkinson's disease or arthritis and genetic disorders in particular genetic disorders of the brain, liver, heart and gastro-intestinal tract, but also alternatively in the treatment of cancer, the cellular vesicles according to the invention preferably comprise a heterologous gene.

In one embodiment, the heterologous gene is inserted in a recombinant adenoviral nucleic acid according to the invention, wherein the gene encoding protein V and/or the gene encoding protein VII is placed under control of a heterologous promoter. This recombinant adenoviral nucleic acid may either be:

- an adenoviral nucleic acid comprising a mutation in the early genes and wherein the gene encoding protein V and/or the gene encoding protein VII is placed under control of a heterologous promoter, preferably conditionally replicating adenovirus and/or a replication-deficient adenovirus vector, or
- an adenoviral nucleic acid, wherein the gene encoding protein V and/or the gene encoding protein VII is placed under control of a heterologous promoter and which does not comprise the early adenoviral genes and does not comprise the genes encoding viral capsid proteins, preferably which does not comprises adenoviral nucleic acid other than the genes encoding protein V and/or protein VII.

In another embodiment the heterologous gene is present on a nucleic acid molecule other than the nucleic acid molecule comprising the adenoviral nucleic acid wherein the gene encoding protein V and/or the gene encoding protein VII is placed under control of a heterologous promoter.

In yet another embodiment the cellular vesicles comprise adenovirus protein V and/or protein VII and a heterologous gene, preferably the cellular vesicles comprise adenovirus protein V and/or protein VII and a nucleic acid molecule comprising the heterologous gene.

The invention further relates to a method for producing an extracellular vesicle according to the invention, comprising:
culturing cells in a medium;
introducing a recombinant adenoviral nucleic acid according to the invention into said cells;
harvesting the extracellular vesicle comprising or filled with recombinant adenoviral nucleic acid.

The method can be performed using a wide range of cell lines, depending on the therapeutic purpose of the EVs. Suitable cell lines include Human embryonic retina (HER) 911, PER.C6, Mesenchymal Stem Cells (MSCs), Neural Stem Cells (NICs), HEK293T, A549 (lung epithelial carcinoma) and primary human glioblastoma cells.

The cells can be cultured according to any suitable method known in the art, the skilled person will know how to do this.

The cells can be cultured using any medium that is suitable for growing. Particularly good results have been obtained when the cells were cultured in Dulbecco's Modified Eagle Medium (DMEM) or the NS (neurosphere, serum-free) medium.

Several additives can be added to the growth medium to further support growing of the cells.

For optimal performance, culturing of the cells takes place in an incubator, preferably at 37° C.

The introduction of the recombinant adenoviral nucleic acid into the cells can be achieved in several ways.

In one embodiment the recombinant adenoviral nucleic acid according to the invention may be stably integrated into the genome of the cell. Integration can be achieved with any suitable method known in the art, preferably via lentiviral transduction or CRISPR-Cas. In an advantageous embodiment only part of the recombinant adenoviral nucleic acid is integrated into the genome of the cell and the remainder of the nucleic acid is delivered into the cell via other means, e.g. as a plasmid or through viral infection of the cell. In a preferred embodiment the genes encoding pV and pVII are integrated into the genome of the cell. In this way, the key proteins pV and pVII are highly expressed by the producer cell allowing for the efficient packing of (adenoviral) nucleic acids present in the cell.

Alternatively it is also possible to introduce the adenoviral nucleic acid into the cell through transfection.

Furthermore, cells comprising the recombinant adenoviral nucleic acid according to the invention are preferably kept under a low (hypoxic) or normal (normoxic) oxygen atmosphere. Cell growth preferably occurs at 37° C. or at 37° C. with temporary cold or temporary heat shocks.

Thus, the invention also provides a cell comprising a recombinant adenoviral nucleic acid according to the invention, preferably HER911, PER.C6 or HEK293T cells. These cells can be used as producer cells to produce adenovirus particles or extracellular vesicles comprising a recombinant adenoviral nucleic acid. Preferably, after introduction of the adenoviral nucleic acid, the cells continuously produce adenovirus particles or extracellular vesicles comprising a recombinant adenoviral nucleic acid, for an unlimited amount of time, for example a couple of weeks after introduction of the adenoviral nucleic acid.

Accordingly, the invention also relates to a method for making such producer cells, comprising:

culturing suitable cells in medium;
introduction of a recombinant adenoviral nucleic acid according to the invention into said cells.

The producer cells thus comprise a recombinant adenoviral nucleic acid wherein the gene encoding protein V and/or the gene encoding protein VII is placed under control of a heterologous promoter. The recombinant nucleic acid can be present as plasmid or it can be stably integrated into the genome of the cell. Further comprised in the invention is a method for producing extracellular vesicles, comprising:
culturing suitable cells in medium;
introduction of a recombinant adenoviral nucleic acid according to the invention into said cells;
harvesting extracellular vesicles comprising the adenoviral nucleic acid. Part of this method may be an assay to verify whether the extracellular vesicles contain the adenoviral nucleic acid or not, such as fluorescence-based detection of labeled protein V or protein VII. In other words, such a test will define if normal EVs or the adenosomes of the present invention are produced.

The extracellular vesicles comprise an adenoviral nucleic acid, preferably comprising a mutation in the early genes, as well as protein V and/or protein VII.

Optionally in this method, the cells comprising the recombinant adenoviral nucleic acid are subjected to cell stress. With such step a cell stress response is provoked. In principle "cell stress" refers to any unfavorable environmental condition for the cell. Examples of cell stress include infection of the cell, e.g. viral infection, preferably with an adenovirus, irradiation of the cells, exposure of the cells to toxins, chemotherapeutic drugs, including genotoxic drugs and proteasome inhibitors, such as melphalan, bortezomib, 5-fluorouracil, cisplatin and doxorubicin, exposure of the cells to temperature differences, exposure of the cells to hypoxic conditions, exposure of cells to an osmotic shock and exposure of cells to oxidative stress. In a preferred embodiment, said cell stress is viral infection of the cell, preferably with a wild-type or recombinant adenovirus, such as a conditionally replicating adenovirus and/or a replication-deficient adenoviral vector.

After introduction of the adenoviral nucleic acid into the cells, the EVs containing the adenoviral nucleic acid are harvested. Typically the EVs containing the adenoviral nucleic acid are harvested after at least 48 hours post infection or transfection by isolation or extraction from the cell or cell culture medium in which they are contained.

In one embodiment, the EVs are isolated from the supernatant by centrifugation of the suspension. The centrifugal force brings the suspended particles to the bottom of the tubes where a pellet is formed. For good results the supernatant is centrifuged for between 60 and 120 minutes, preferably 70 minutes at a high speed, preferably of about 100.000×g.

Optionally, the supernatant is first centrifuged to remove larger particles such as cells from the supernatant comprising the EVs. Additionally the supernatant might be filtered over a suitable filter, to remove larger particles such as cellular debris.

After isolation of the pellet, the pellet is preferably suspended in a suitable solvent and the suspension is optionally centrifuged again. The pellet is again isolated and the solvent, which might contain contaminants such as proteins, may be removed. Any suitable solvent may be used which has the potential to suspend the pellet and dissolve possible contaminants. Particular good results have been obtained with buffers, such as phosphate-buffered saline (PBS).

The pellet is then resuspended in a suitable solvent, preferably PBS and loaded onto an iodixanol gradient. After centrifugation the fractions comprising EVs containing adenoviral material are isolated.

The invention also comprises therapeutic compositions comprising the adenovirus particles of the invention or the cellular vesicle according to the invention and a pharmaceutically acceptable carrier or vehicle. In a preferred embodiment, the cellular vesicle is an extracellular vesicle or a vesicle derived from lysed cells, preferably MSCs, and comprising components from the plasma membrane of said cells. In a particularly preferred embodiment, the cellular vesicle is an extracellular vesicle.

The invention further relates to a method for treatment of genetic disorders, comprising:
 administration of therapeutic composition, cellular vesicle or adenovirus particle according to the invention to a subject in need thereof. In a preferred embodiment, the cellular vesicle is an extracellular vesicle or a vesicle derived from lysed cells, preferably MSCs, and comprising components from the plasma membrane of said cells. In a particularly preferred embodiment, the cellular vesicle is an extracellular vesicle.

The invention provides in a method wherein EVs can be produced ex vivo by infecting a cell with an adenovirus according to the invention. The EVs can then be administered to the subject. In another object of the invention the subject is directly provided with the adenovirus as described herein. These viruses then infect the target cell in the subject in which extracellular vesicles are formed and further distributed through the body.

The mode of administration can vary. Routes of administration include oral, rectal, transmucosal, intestinal, parenteral, intramuscular, subcutaneous, intradermal, intramedullary, intrathecal, direct intraventricular, intravenous, intraperitoneal, intranasal, intraocular, intratumoral, inhalation, insufflation, topical, cutaneous, transdermal, intra-arterial, epidural or intracranial.

In particular embodiments, the therapeutic composition, adenovirus or cellular vesicles of the invention can be administered by an invasive route such as by injection. In further embodiments of the invention, the therapeutic composition, adenovirus or cellular vesicles of the invention are administered intravenously, subcutaneously, intramuscularly, intra-arterially, intracranially, epidurally, intratumorally or by inhalation, aerosol delivery. Administration by non-invasive routes (e.g., oral; for example, in a pill, capsule or tablet, topical, rectal) is also within the scope of the present invention.

Determination of the appropriate dose is made by the clinician, e.g., using parameters or factors known or suspected in the art to affect treatment. Generally, the dose begins with an amount somewhat less than the optimum dose and it is increased by small increments thereafter until the desired or optimum effect is achieved relative to any negative side effects. Important diagnostic measures include those of symptoms of, e.g., inflammation or level of inflammatory cytokines produced.

The therapeutic compositions, cellular vesicles or adenovirus particles according to the invention may be in liquid or solid dosage form. In case a liquid dosage form is used, it may comprise a spray, a mist, a suspension, a solution, an emulsion or an aerosol. Solid dosage forms comprise capsules, tablets, granules, powders and gels.

The therapeutic compositions, adenovirus particles and cellular vesicles disclosed herein may be provided by continuous infusion, or by doses administered, e.g., daily, 1-7 times per week, weekly, bi-weekly, monthly, bimonthly, quarterly, semiannually, annually etc. A total weekly dose is generally at least 0.05 µg/kg body weight, more generally at least 0.2 µg/kg, 0.5 µg/kg, 1 µg/kg, 10 µg/kg, 100 µg/kg, 0.25 mg/kg, 1.0 mg/kg, 2.0 mg/kg, 5.0 mg/ml, 10 mg/kg, 25 mg/kg, 50 mg/kg or more (see, e.g., Yang, et al. (2003) *New Engl. J. Med.* 349:427-434; Herold, et al. (2002) *New Engl. J. Med.* 346:1692-1698; Liu, et al. (1999) *J. Neurol. Neurosurg. Psych.* 67:451-456; Portielje, et al. (2003) *Cancer Immunol. Immunother.* 52:151-144; Willis et al. *Front Cardiouasc. Med.,* 2017, 4, 63). Doses may also be provided to achieve a pre-determined target concentration of the adenosomes or adenoviral particles in the subject's serum, such as 0.1, 0.3, 1, 3, 10, 30, 100, 300 µg/ml or more or about $10^8$ to $10^{12}$ viral particles. In other embodiments, the adenosomes or adenoviral particles of the present invention are administered, e.g., orally or intravenously, on a weekly, biweekly, "every 4 weeks," monthly, bimonthly, or quarterly basis at 10, 20, 50, 80, 100, 200, 500, 1000 or 2500 mg/subject.

As used herein, the term "effective amount" refers to an amount of the adenovirus or extracellular vehicle of the invention that, when administered alone or in combination with an additional therapeutic agent to a cell, tissue, or subject, is effective to cause a measurable improvement in one or more symptoms of disease. An effective dose further refers to that amount of the adenovirus particle or adenosome sufficient to result in at least partial amelioration of symptoms, e.g. shrinkage of the tumor, restoration of enzyme production in the liver, decrease in intracranial plaque accumulation and improved memory, improved cardiac function after infarct. When applied to an individual as active ingredient administered alone, an effective dose refers to that ingredient alone. When applied as a combination, an effective dose refers to the combined amounts of the active ingredients that result in the therapeutic effect, whether administered in combination, serially or simultaneously. An effective amount of a therapeutic will result in an improvement of a diagnostic measure or parameter by at least 10%; usually by at least 20%; preferably at least about 30%; more preferably at least 40%, and most preferably by at least 50%. An effective amount can also result in an improvement in a subjective measure in cases where subjective measures are used to assess disease severity.

The therapeutic composition, adenovirus particle or adenosome according to the invention may be delivered as monotherapy or as combination therapy. For example, the adenosomes or adenovirus particles may be administered in combination with common anti-cancer agents, such as chemotherapeutics, radiation-therapy, immune checkpoint inhibitors, targeted small-molecules (e.g. kinase inhibitors or proteasome inhibitors).

The invention also relates to a kit for detection of a disease. The kit comprises an adenovirus particle comprising a labeled adenoviral nucleic acid and/or adenosome comprising a labeled adenoviral nucleic acid. Alternatively, the kit comprises the therapeutic composition, adenovirus particle or adenosome according to the invention and a labeled antibody that is specific for the virus or for a heterologous compound that may be produced by the virus.

EXAMPLES

Example 1: Detection of Adenoviral Core Proteins Inside EVs by Mass-Spectrometry GS184 cells (primary glioblastoma cells obtained from the Erasmus MC, Dept. of Neurosurgery) were plated in ten T175 flasks 24 h before infection with wild-type HAdV-5. The cells were cultured as monolayers on a coating of extracellular matrix (ECM 1:100 in dPBS, Cultrex, Sanbio) in NS medium (DMEM-F12+fibroblast growth factor+endothelial growth factor+heparin+B27+1% penicillin-streptomycin). The cells were infected with wild-type human adenovirus type 5 (HAdV-5) with a MOT of 5 infectious particles per cell. Medium was refreshed after 2 h to NS medium. Supernatant and cells were collected at 40 h after infection. EVs were isolated from the cell culture supernatant as described in De Vrij, 2013, Nanomedicine (Lond), 8(9):1443-58, using an iodixanol-based density-gradient (ultracentrifugation at 192,000 g for 4 hr). The iodixanol gradient consisted of three layers: 40% iodixanol as the bottom layer (2 mL), 25% iodixanol as the middle layer (6 mL) and 5% iodixanol as the top layer (2 mL) (FIG. 1a). EVs were previously shown to concentrate in the interphase region between the top and middle fractions (De Vrij, 2013, Nanomedicine (Lond), 8(9):1443-58). Adenovirus particles are known to concentrate at the bottom (40% iodixanol) fraction. Iodixanol fractions were subjected to SDS-PAGE and western blotting (protocol as described in De Vrij, 2013, Nanomedicine (Lond), 8(9):1443-58), using antibodies against the adenovirus fiber protein and the Rab27a protein, which is specific for the exosome type of EVs (FIG. 1b). Using the protocol as described in De Vrij, 2015, Int J Cancer, 137(7):1630-42, the cell pellets and purified EV and virus preparations were subjected to mass-spectrometry analysis to obtain in-depth information on the protein contents (FIG. 1c). In brief, samples were dissolved in 50 µl lysis buffer (RapiGest™ surfactant (1 mg ml$^{-1}$; Waters Corporation, MA) in 50 mM ammoniumbicarbonate. Reduction and alkylation was performed by adding 2 ml of 0.5 M dithiothreitol to each sample, followed by incubation for 30 min at 60° C. After cooling down to room temperature, 10 ml of 0.3 M iodoacetamide was added, followed by incubation in the dark for 30 min. Subsequently, 1.5 ml of 100 ng ml$^{-1}$ gold trade trypsin (Promega, Madison, WI) in 3 mM Tris-HCL (diluted 1:10 in 50 mM NH$_4$HCO$_3$) was added to each sample, followed by overnight incubation at 37° C. To inactivate trypsin, 3 ml of 25% trifluor-acidic acid was added and samples were incubated for 30 min at 37° C. Next, the samples were centrifuged at 10,000×g for 15 min at 4° C. and the supernatant was transferred to LC/MS-certified vials (Waters Corporation). For each sample, a fraction (10%) of the total volume was measured on a nanoliquid chromatography (nano-LC) system (Ultimate 3000 Nano-LC system, Dionex, Thermo Scientific, Amsterdam, The Netherlands) to determine relative concentrations. Based on these measurements, the injection volume for each individual sample could be adjusted to allow for MS analysis of equal amounts of digested samples. MS analysis was performed using a coupled nano-LC system with an Orbitrap MS platform (LTQ-Orbitrap XL, Thermo Scientific). MS spectra were extracted from raw data files and converted into Mascot generic format (MGF) files using Extract-MSN (part of XCalibur (version 2.0.7), Thermo Scientific). The data files were searched by Mascot (version 2.3; Matrix Science, London, UK) against the UniProt Swiss-Prot database selected for *Homo sapiens* and virus proteins. As demonstrated in FIG. 1c, both viral capsid and core proteins were detected in the cells and virus. However, the EVs appeared to exclusively contain the core proteins (V and VII), which were abundantly present.

Example 2: Oncolytic Adenovirus DNA is Detected by PCR in EVs and the EVs are Capable to Infect Cells GS756 cells were plated in two T175 flasks 24 h before infection with the conditionally replicating Adenovirus (CRAd) Ad.5.d24.RGD.GFP (MOI=1 infectious particle per cell). (Virus details including genomic construction are provided in Balvers, 2014, Viruses, 6(8), 3080-3096.) After 72 hours, the supernatant was collected for EV isolation. Low-speed centrifugations were performed to remove cells and cell debris (150×g for 5 minutes plus 3000×g for 20 minutes) followed by ultracentrifugation at 100.000×g for 70 minutes to pellet EVs and viral particles. The pellets were subjected to iodixanol density gradient centrifugation and iodixanol fractions were isolated as described above.

To determine the amount of EVs within each fraction, samples were prepared for EV-Quant analysis. For this, samples were incubated with a red-fluorescent dye (Rhodamine at a final concentration of 0.33 ng/µl), which labels the membrane of the EVs. Next, EVs were immobilized (by adding a TEMED Bis-Acrylamide and APS Bis-Acrylamide (1:1)) in a 96-wells plate with a glass bottom followed by image acquisition using a confocal microscope (Opera Phenix system, Perkin Elmer). The membrane labelling of the vesicles can be visualized as red dots. Data obtained from the Opera system was converted in a Microsoft Excel template, to provide EV count numbers and the concentration of EVs. Plots were made using Graphpad PRISM 6.0, showing EVs in the top fractions FIG. 2a).

To detect the presence of viral genomes in EVs, quantitative PCR (qPCR) was performed. For detection of viral DNA, primers were used that bind to sequences of the viral fiber protein (HAdV5_fiber_ForPrim1, sequence: CAAGGACCCCTCACAGTGTC); HAdV5_fiber_RevPrim1, sequence: AGGGTACTGC-TATCGGTGGT). The qPCR was performed with the Applied Bioscience SYBR Green method, using standard PCR amplification settings. The Adenoviral log (10) copy number was determined by generating a standard curve, derived from serial dilutions of full-length adenoviral DNA (linearized viral genome). Ct values were converted to Log (10) copy numbers based on the generated standard curve, all samples were measured in Duplo. Data was plotted using Graphpad PRISM 6.0 showing presence of viral DNA in the bottom (as expected), but also at the top FIG. 2b).

For all iodixanol fractions the infectivity was assessed, by exposing these fractions to A549 lung carcinoma cells. At 72 hours post infection, fluorescence microscopy was performed to determine infectivity, as measured by the percentage of GFP-positive cells. Counting of total cell numbers was facilitated by adding NucBlue™ stain (Thermo Fisher Scientific). Cell counting was performed using the Image J software (FIJI) which showed the ability of the EVs to infect cells (FIG. 2c).

Example 3: EV-Quant Demonstrates pV. GFP Incorporation in EVs after Infecting Cells with pV. GFP Virus Cells (GS184, GS562, A549 and HER911) were plated on 48 well plates 24 h before infection with an adenovirus with green fluorescent protein attached to the pV protein (pV.GFP). The cells were infected with a MOI of 50 viral particles per cell in 100 µL medium per well (NS medium for GS184 and GS562 and serum medium for HER911/A549). (serum medium: Dulbecco's Modified Eagle Medium+10%

Fetal Bovine serum (FBS)+1% penicillin-streptomycin). Medium was refreshed after 2 h to NS medium, DMEM only and serum medium for each cell line. (Serum medium was pre-cleared from bovine EVs by ultracentrifugation for 16 h at 100,000×g). Triplicates were used for each medium condition for all cell lines. Supernatants were collected at 64 h after infection and centrifuged at 500×g for 10 min. to remove cell debris. EV-Quant analysis was performed on 143 µL of all supernatants. With GFP fused to the pV protein it was anticipated that viral particles would appear in the EV-Quant assay as green dots. In addition, The samples were incubated with a red fluorescent dye, which labels the membrane of the EVs.

Accordingly, the adenosomes can be visualized as a combination of red and green dots (pseudo-coloured by the software as yellow dots). Consequently, three types of particles were quantified using the EV-Quant assay: red only (empty EVs), green only (virus), red+green (yellow) (adenosomes) (FIG. 3a). At 64 h post infection of GS184 cells, substantial amounts of adenosomes were detected in the supernatant. (FIG. 3b). It was further found that adenosome secretion occurs for different cell types (GS562, HER911, A549) and that the type of culturing medium can affect the adenosome secretion, e.g. with increased yields of EVs for HER911 cells cultured in DMEM without serum (FIG. 3c). Finally, it was demonstrated that adenosome concentration in the supernatant of cells increases over time FIG. 3d).

Example 4: Biomarker Potential of Adenosomes: Correlating Adenosome Levels with Oncolytic Virus Infectivity Four different GS cultures were infected with the pV-GFP adenovirus and it was assessed whether the infection of the cells correlates with the secretion of the adenosomes (FIG. 4). At six days post infection, the adenosome level was determined by EV-Quant and the cell viability was measured by means of a luminescent ATP-based cell viability assay (CellTiterGlo, Promega). Luminescence was measured with a luminometer (Infinite M200 Tecan Reader). Linear regression analysis and statistical testing was performed using GraphPad Prism.

It was found that after infecting cancer cells the adenosome levels correlate with the infectivity levels of the adenovirus, as evidence by a strong negative correlation between adenosome concentration and cell viability (FIGS. 4a and 4b). This opens opportunities for adenosomes as biomarker platform.

Example 5: Infection of Adenosomes and Viral Fraction from

Ad5.d24.RGD.GFP on Neurospheres

HER911 cells (six T175 flasks, grown in DMEM medium with serum) were infected with the CRAd Ad5.d24.RGD.GFP. Medium was refreshed with DMEM serum-free medium after 2 h. After 48 h the standard iodixanol-based procedure (as described above) was used to separate adenosomes from virus particles. The top fraction (4 mL) and the bottom fraction (4 mL) of the gradient was collected. The fractions, plus 6 mL PBS per fraction, were passed through Amicon 100 kD centrifuge filters to concentrate the particles, resulting in end volumes of 200 µL. Before adding the samples to neurospheres, infectious particle titers were determined on monolayered GS cells. Neurospheres were established from GS940 primary tumor cells (one sphere per well) and were infected at equal infectious titers with adenosomes and viral particles when they were 7 d old. Confocal microscopy was performed at 6 d after infection to analyze for GFP expression inside the neurospheres. The depth of GFP expression appeared similar for the adenosomes and the viral particles (FIG. 5).

Example 6: Heterologous Expression of pV.pVII Results in Enhanced Incorporation of DNA into EVs HER911 cells were plated in four T75 flasks in serum medium. One day later, cells were transfected (FuGENE6 protocol with 850 µl medium+34 µl FuGENE+17 µg DNA added to 10 ml medium) with maxi-prepped DNA plasmids: two flasks with pUC57. CMV.Crimson_CMV.eGFP and two flasks with pUC57. CMV. Crimson-pVII_CMV.eGFP-pV see FIG. 6a). After synthesis of the DNA plasmids, sequencing was performed as quality control. The sequences of pV and pVII were derived from the wild-type HAdV-5 genome sequence. In between the fluorescent tag sequences (eGFP and Crimson) and pV/pVII a sequence was introduced in frame encoding for a flexible linker (aacggcggagggagc). One day after transfection, fluorescence of both eGFP and Crimson (infra-red) was observed in the cells by microscopy (Nikon Wide-field microscope) with transfection efficiencies of approximately 70% in all cases. Of interest, eGFP and Crimson were (as expected) observed homogenous throughout the cells, while the eGFP-pV and Crimson-pVII signals appeared as dots. The cells in all flasks did not show any signs of stress/loss in cell viability, which also shows no toxicity of the pV/pVII proteins. One day after transfection the cells were infected for 2 h with wild-type HAdV-5 (MOI=5 infectious units per cell) after which the medium was replaced with DMEM-only medium. One day after infection the first signs of infection became apparent, which was, remarkably, only to be seen for the flask with Crimson-pVII_.eGFP-pV containing cells. For the flask with the Crimson_eGFP containing cells the infectivity became apparent after two days, which is standard for HAdV-5 infection. At three days post infection, the supernatants from the four flasks were harvested and the standard iodixanol-based procedure (as described above) was used to isolate the EVs. (EVs were in fractions 4 to 7). qPCR (as described above) was performed to analyze the loading of DNA in the EVs. This clearly showed that the heterologous expression of pV/pVII further boosted the incorporation of the viral genome DNA (FIG. 6b, upper figure). Moreover, also an increase in the incorporation of pUC57 DNA was observed, which required not only the presence of the pUC57 plasmid, but also an additional factor, in this case related to adenovirus infection (FIG. 6b, lower figure). For importance of using pV/pVII as packaging module inside oncolytic adenoviruses, expression of the protein module did not negatively interfere with the virus yield and the yield of virus was even slightly increased.

The invention claimed is:

1. Cellular vesicle comprising a recombinant adenoviral nucleic acid, wherein the recombinant adenoviral nucleic acid comprises a mutation in the early genes, wherein the gene encoding protein V and/or the gene encoding protein VII is placed under control of a heterologous promoter.

2. Cellular vesicle comprising a recombinant adenoviral nucleic acid wherein the gene encoding protein V and/or the gene encoding protein VII is placed under control of a heterologous promoter.

3. Cellular vesicle according to claim 2, further comprising a heterologous gene.

4. Cellular vesicle according to claim 2, further comprising an adenoviral nucleic acid comprising a mutation in the early genes.

5. Cellular vesicle according to claim 3, comprising
   a nucleic acid molecule comprising said recombinant adenoviral nucleic acid, wherein the gene encoding protein V and/or the gene encoding protein VII is placed under control of a heterologous promoter and said heterologous gene; or
   a nucleic acid molecule comprising said recombinant adenoviral nucleic acid, wherein the gene encoding protein V and/or the gene encoding protein VII is placed under control of a heterologous promoter and a nucleic acid molecule comprising said heterologous gene.

6. Cellular vesicle comprising:
   i. a nucleic acid molecule comprising a recombinant adenoviral nucleic acid wherein the gene encoding protein V and/or the gene encoding protein VII is placed under control of a heterologous promoter and wherein said nucleic acid does not comprise adenoviral nucleic acid other than the genes encoding protein V and/or protein VII, and a recombinant adenoviral nucleic acid comprising a mutation in the early genes, and optionally a heterologous gene, or
   ii. a recombinant adenoviral nucleic acid wherein the gene encoding protein V and/or the gene encoding protein VII is placed under control of a heterologous promoter, wherein protein V and/or protein VII is fused with a heterologous molecule, and wherein said nucleic acid does not comprise adenoviral nucleic acid other than the genes encoding protein V and/or protein VII, or
   iii. adenoviral protein V and/or protein VII, wherein protein V and/or protein VII is fused with a heterologous molecule, and a recombinant adenoviral nucleic acid comprising a mutation in the early genes, wherein the recombinant adenoviral nucleic acid is an adenoviral nucleic acid of a conditionally replicating adenovirus and/or a replication-deficient adenovirus vector, or
   iv. adenoviral protein V and/or protein VII wherein protein V and/or protein VII is fused with a heterologous molecule.

7. Cellular vesicle according to claim 2, wherein the adenoviral nucleic acid wherein the gene encoding protein V and/or the gene encoding protein VII is placed under control of a heterologous promoter does not comprise adenoviral nucleic acid other than the genes encoding protein V and/or protein VII.

8. Cellular vesicles according to claim 1 wherein the vesicle is an extracellular vesicle.

9. Cellular vesicles according to claim 2 wherein the vesicle is an extracellular vesicle.

10. Cellular vesicles according to claim 6 wherein the vesicle is an extracellular vesicle.

11. A method for preparing a cellular vesicle according to claim 1, comprising
    culturing cells in a medium;
    introducing a recombinant adenoviral nucleic acid into the cells, wherein the recombinant adenoviral nucleic acid comprises a mutation in the early genes, wherein the gene encoding protein V and/or the gene encoding protein VII is placed under control of a heterologous promoter; and
    harvesting the cellular vesicle.

12. A method for preparing a cellular vesicle according to claim 6, comprising
    culturing cells in a medium;
    introducing into the cells:
    i. a nucleic acid molecule comprising a recombinant adenoviral nucleic acid wherein the gene encoding protein V and/or the gene encoding protein VII is placed under control of a heterologous promoter and wherein said nucleic acid does not comprise adenoviral nucleic acid other than the genes encoding protein V and/or protein VII, and a recombinant adenoviral nucleic acid comprising a mutation in the early genes, and optionally a heterologous gene, or
    ii. a recombinant adenoviral nucleic acid wherein the gene encoding protein V and/or the gene encoding protein VII is placed under control of a heterologous promoter, wherein protein V and/or protein VII is fused with a heterologous molecule, and wherein said nucleic acid does not comprise adenoviral nucleic acid other than the genes encoding protein V and/or protein VII, or
    iii. adenoviral protein V and/or protein VII, wherein protein V and/or protein VII is fused with a heterologous molecule, and a recombinant adenoviral nucleic acid comprising a mutation in the early genes, wherein the recombinant adenoviral nucleic acid is an adenoviral nucleic acid of a conditionally replicating adenovirus and/or a replication-deficient adenovirus vector, or
    iv. adenoviral protein V and/or protein VII wherein protein V and/or protein VII is fused with a heterologous molecule;
    and
    harvesting the cellular vesicle.

13. A method of treating a disease selected from the group consisting of genetic disorders, cancer or aging diseases, comprising administrating a cellular vesicle according to claim 5 to a subject in need thereof.

14. A method of treating a disease selected from the group consisting of genetic disorders, cancer or aging diseases, comprising administrating a cellular vesicle according to claim 10 to a subject in need thereof.

* * * * *